United States Patent
Soriaga et al.

(10) Patent No.: US 11,272,511 B2
(45) Date of Patent: Mar. 8, 2022

(54) SUPPORTING OUT-OF-ORDER OPERATION

(71) Applicant: QUALCOMM Incorporated, San Diego, CA (US)

(72) Inventors: Joseph Binamira Soriaga, San Diego, CA (US); Seyedkianoush Hosseini, San Diego, CA (US); Gabi Sarkis, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 150 days.

(21) Appl. No.: 16/840,838

(22) Filed: Apr. 6, 2020

(65) Prior Publication Data

US 2020/0322944 A1 Oct. 8, 2020

Related U.S. Application Data

(60) Provisional application No. 62/845,127, filed on May 8, 2019, provisional application No. 62/831,157, filed on Apr. 8, 2019.

(51) Int. Cl.
*H04W 72/04* (2009.01)
*H04W 72/12* (2009.01)
(Continued)

(52) U.S. Cl.
CPC ....... *H04W 72/048* (2013.01); *H04L 41/0806* (2013.01); *H04W 72/042* (2013.01);
(Continued)

(58) Field of Classification Search
CPC ... H04L 1/1854; H04L 5/0055; H04L 1/1887; H04L 1/0026; H04L 1/0031; H04L 5/001;
(Continued)

(56) References Cited

U.S. PATENT DOCUMENTS 9,185,643 B2 * 11/2015 Jouin .................. E05D 3/12
2014/0233403 A1 * 8/2014 Kreuchauf ........... H04L 1/0007
370/252

(Continued)

OTHER PUBLICATIONS

"3rd Generation Partnership Project; Technical Specification Group Radio Access Network; Study on Physical Layer Enhancements for NR Ultra-Reliable and Low Latency Case (URLLC) (Release 16)", 3GPP Standard, Technical Report, 3GPP TR 38.824, 3rd Generation Partnership Project (3GPP), Mobile Competence Centre, 650, Route Des Lucioles, F-06921 Sophia-Antipolis Cedex, France, No. V16.0.0, Mar. 27, 2019 (Mar. 27, 2019), pp. 1-78, XP051722955, pp. 1-92, [retrieved on Mar. 27, 2019], Chapter 6.4.2, "out-of-order HARQ and PUSCH scheduling".

(Continued)

*Primary Examiner* — Sai Aung
(74) *Attorney, Agent, or Firm* — Holland & Hart LLP

(57) ABSTRACT

Methods, systems, and devices for wireless communications are described. A user equipment (UE) may support efficient techniques for a capability based solution for handling an out-of-order operation for processing multiple downlink channels. In some cases, the UE may indicate, to a base station, a number of processing units needed to support a given priority class of communications with the base station, a maximum possible data rate per priority class of communications, or different numbers of component carriers (e.g., and a number of layers) that can be used for each priority class of communications. The base station may then configure the UE to receive and/or transmit channels of different priority classes based on the indication to not exceed the number of processing units, the maximum data rate, the number of component carriers, etc. for a corresponding priority class.

30 Claims, 20 Drawing Sheets

(51) Int. Cl.
  *H04W 72/10* (2009.01)
  *H04W 72/08* (2009.01)
  *H04L 41/0806* (2022.01)
(52) U.S. Cl.
  CPC ......... *H04W 72/085* (2013.01); *H04W 72/10* (2013.01); *H04W 72/0453* (2013.01)
(58) Field of Classification Search
  CPC ......... H04W 72/0453; H04W 72/0413; H04W 72/1268; H04W 72/1273
  See application file for complete search history.

(56) References Cited

U.S. PATENT DOCUMENTS

| | | | | |
|---|---|---|---|---|
| 2014/0321376 | A1* | 10/2014 | Damnjanovic ... | H04W 72/1215 370/329 |
| 2018/0324778 | A1 | 11/2018 | Farajidana et al. | |
| 2019/0149365 | A1* | 5/2019 | Chatterjee ........... | H04L 25/0226 370/329 |
| 2019/0215729 | A1* | 7/2019 | Oyman ................... | H04L 65/80 |
| 2019/0215863 | A1* | 7/2019 | Kim ....................... | H04W 36/06 |
| 2019/0350025 | A1* | 11/2019 | Eriksson ........... | H04W 28/0252 |
| 2020/0015191 | A1* | 1/2020 | Lee ....................... | H04W 16/28 |
| 2021/0112591 | A1* | 4/2021 | Lee ..................... | H04W 74/008 |

OTHER PUBLICATIONS

International Search Report and Written Opinion—PCT/US2020/027063—ISAEPO—dated Jun. 26, 2020(192272WO).

Nokia, et al., "Discussion on Enhancements to Scheduling/HARQ for NR URLLC", 3GPP Draft, 3GPP TSG RAN WG1 Meeting #96bis, R1-1904829 NR URLLC Scheduling HARQ Enhancements, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 3, 2019 (Apr. 3, 2019), XP051707328, 6 Pages, Retrieved from the Internet: URL: http://www.3gpp.org/ftp/tsg%5Fran/WG1%5FRL1/TSGR1%5F96b/Docs/R1%2D1904829%2Ezip, [retrieved on Apr. 3, 2019], Chapter 3, "Intra-UE DL Prioritization".

Qualcomm Incorporated: "Processing Timeline Enhancements for eURLLC", 3GPP Draft, 3GPP TSG-RAN WG1 #96, R1-1903007 Processing Timeline Enhancements for eURLLC, 3rd Generation Partnership Project (3GPP), Mobile Competence Centre, 650, Route Des Lucioles, F-06921, Sophia-Antipolis Cedex, FRA, vol. RAN WG1, No. Athens, Greece, Feb. 25, 2019-Mar. 1, 2019, Feb. 16, 2019 (Feb. 16, 2019), XP051600704, 16 Pages, Retrieved from the Internet: URL: http://www.3gpp.org/ftp/tsg%5Fran/WG1%5FRL1/TSGR1%5F96/Docs/R1%2D1903007%2Ezip, [retrieved on Feb. 16, 2019], Chapter 5, "Out-of-order HARQ and scheduling for eURLCC".

SAMSUNG: "Potential Enhancements for Scheduling & HARQ & CSI Processing Timeline", 3GPP Draft, 3GPP TSG RAN WG1 #96, R1-1902299 EURLLC Processing Time, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599993, pp. 1-14, Retrieved from the Internet: URL: http://www.3gpp.org/ftp/tsg%5Fran/WG1%5FRL1/TSGR1%5F96/Docs/R1%2D1902299%2Ezip, [retrieved on Feb. 15, 2019], Chapter 4, "Out-of-order HARQ".

\* cited by examiner

SUPPORTING OUT-OF-ORDER OPERATION

CROSS REFERENCES

The present application for patent claims the benefit of U.S. Provisional Patent Application No. 62/831,157 by SORIAGA et al., entitled "SUPPORTING OUT-OF-ORDER OPERATION," filed Apr. 8, 2019, and the benefit of U.S. Provisional Patent Application No. 62/845,127 by SORIAGA et al., entitled "SUPPORTING OUT-OF-ORDER OPERATION," filed May 8, 2019, each of which is assigned to the assignee hereof, and each of which is expressly incorporated by reference herein.

BACKGROUND

The following relates generally to wireless communications, and more specifically to supporting out-of-order operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless networks, a UE may receive multiple downlink messages on corresponding downlink channels from a base station that include an associated uplink or downlink channel for the UE to transmit a corresponding uplink message or downlink message, respectively, based on receiving and decoding the downlink message(s). Accordingly, the UE may use configured processing blocks for channel estimation, modulation/demodulation, encoding/decoding, etc., to receive the downlink message(s) on their associated downlink channels from the base station and prepare the uplink message(s) to transmit back to the base station or prepare to receive further downlink message(s). However, different downlink messages (e.g., on different downlink channels) may be received out of order, which may affect an ability of the UE to process the downlink channels. For example, the UE may receive a first downlink channel (e.g., associated with a first priority) and may receive a second downlink channel (e.g., associated with a second priority higher than the first priority) while processing the first downlink channel. As such, the UE may be in the middle of using the processing blocks for processing the first downlink channel when the second downlink channel is received, reducing the ability of the UE to process the second downlink channel (e.g., even though the second downlink channel has a higher priority), thereby increasing the latency of processing the second downlink channel and transmitting a corresponding uplink message or receiving a corresponding downlink message.

SUMMARY

The described techniques relate to improved methods, systems, devices, and apparatuses that support out-of-order operation. Generally, the described techniques provide for a user equipment (UE) to transmit a capability for supporting multiple priority classes for communications with a base station, to receive a first downlink signal and then a second downlink signal each associated with a different priority class, and then to communicate with the base station based on the capability and responding to the second downlink signal before the first downlink signal. For example, the UE may transmit an uplink signal associated with the second downlink signal prior to transmitting an uplink signal associated with the first downlink signal, receive a subsequent downlink signal associated with the second downlink signal prior to receiving a subsequent downlink signal associated with the first downlink signal, or a combination thereof. In some cases, the capability for supporting the multiple priority classes may include an indication of a set of processing units for supporting the different priority classes, an indication of a scaling factor or a maximum data rate for each of the priority classes or combinations of the priority classes, an indication of different component carriers (CCs) for supporting the multiple priority classes, or a combination thereof. In some cases, the UE may use the capability for supporting the multiple priority classes for communications with the base station based on receiving an indication from the base station for the UE to use the capability. In some cases, the base station may configure the UE to operate to communicate traffic according to the multiple priority classes supported by the capability of the UE.

A method of wireless communication at a UE is described. The method may include transmitting, to a base station, an indication of a UE capability to support a set of priority classes for communications on a set of frequency resources of a radio frequency spectrum band, receiving, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes, and communicating, based on the indicated UE capability, a first response signal associated with the first downlink signal and a second response signal associated with the second downlink signal, where the first response signal is communicated following the second response signal.

An apparatus for wireless communication at a UE is described. The apparatus may include a processor, memory in electronic communication with the processor, and instructions stored in the memory. The instructions may be executable by the processor to cause the apparatus to transmit, to a base station, an indication of a UE capability to support a set of priority classes for communications on a set of frequency resources of a radio frequency spectrum band, receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes, and communicate, based on the indicated UE capability, a first response signal associated with the first downlink signal and a second response signal associated with the second downlink signal, where the first response signal is communicated following the second response signal.

Another apparatus for wireless communication at a UE is described. The apparatus may include means for transmitting, to a base station, an indication of a UE capability to support a set of priority classes for communications on a set of frequency resources of a radio frequency spectrum band, receiving, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes, and communicating, based on the indicated UE capability, a first response signal associated with the first downlink signal and a second response signal associated with the second downlink signal, where the first response signal is communicated following the second response signal.

A non-transitory computer-readable medium storing code for wireless communication at a UE is described. The code may include instructions executable by a processor to transmit, to a base station, an indication of a UE capability to support a set of priority classes for communications on a set of frequency resources of a radio frequency spectrum band, receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes, and communicate, based on the indicated UE capability, a first response signal associated with the first downlink signal and a second response signal associated with the second downlink signal, where the first response signal is communicated following the second response signal.

Some examples of the method, apparatuses, and non-transitory computer-readable medium described herein may further include operations, features, means, or instructions for determining a maximum data rate for the first priority class and determining a maximum data rate for the second priority class.

In some examples of the method, apparatuses, and non-transitory computer-readable medium described herein, transmitting the indication of the UE capability may include operations, features, means, or instructions for transmitting an indication of the maximum data rate for the first priority class and an indication of the maximum data rate for the second priority class, and receiving the first downlink signal and the second downlink signal may be based at least in part on transmitting the indication of the maximum data rate for the first priority class and the indication of the maximum data rate for the second priority class.

Some examples of the method, apparatuses, and non-transitory computer-readable medium described herein may further include operations, features, means, or instructions for identifying a set of processing units of the UE to support the set of priority classes, each of the set of processing units associated with a respective one of the set of priority classes, and the indication of the UE capability may include an indication of the identified set of processing units of the UE.

Some examples of the method, apparatuses, and non-transitory computer-readable medium described herein may further include operations, features, means, or instructions for identifying a set of combinations of the set of priority classes, each combination of the set of combinations including one or more priority classes of the set of priority classes, and determining, for each combination of the set of combinations, a scaling factor for communications by the UE based on a maximum data rate for communications by the UE, where the indication of the UE capability includes an indication of the determined scaling factors.

Some examples of the method, apparatuses, and non-transitory computer-readable medium described herein may further include operations, features, means, or instructions for determining, for each priority class of the set of priority classes, a carrier aggregation (CA) capability of the UE associated with the priority class, and the indication of the UE capability may include an indication of the indication of the determine.

In some examples of the method, apparatuses, and non-transitory computer-readable medium described herein, the indication of the UE capability further includes a multiple-input multiple-output (MIMO) capability, or a maximum modulation order, or a maximum number of resource blocks, or a combination thereof.

Some examples of the method, apparatuses, and non-transitory computer-readable medium described herein may further include operations, features, means, or instructions for receiving, from the base station in response to the transmitted indication of the UE capability, an indication that the UE capability are to be used, and the first downlink signal, or the second downlink signal, or the first response signal, or the second response signal, or a combination thereof, may be received based on the received indication that the UE capability are to be used.

Some examples of the method, apparatuses, and non-transitory computer-readable medium described herein may further include operations, features, means, or instructions for receiving, for each of the first downlink signal and the second downlink signal, an indication of a priority class of the set of priority classes associated with the downlink signal.

In some examples of the method, apparatuses, and non-transitory computer-readable medium described herein, the received indication of the priority class includes a downlink control information (DCI) format, or a DCI bit, or a transmission configuration indication (TCI) state, or a radio network temporary identifier (RNTI), or a control resource set (CORESET) index, or a search space index, or a combination thereof, of the downlink signal.

In some examples of the method, apparatuses, and non-transitory computer-readable medium described herein, the first priority class may be associated with a first processing timeline, and the second priority class may be associated with a second processing timeline that is shorter than the first processing timeline.

In some examples of the method, apparatuses, and non-transitory computer-readable medium described herein, transmissions associated with the first priority class may be in order relative to other transmissions of the first priority class, and transmissions associated with the second priority class may be in order relative to other transmissions of the second priority class.

Some examples of the method, apparatuses, and non-transitory computer-readable medium described herein may further include operations, features, means, or instructions for identifying the UE capability per CC, or per band, or per band combination, or a combination thereof.

In some examples of the method, apparatuses, and non-transitory computer-readable medium described herein, transmitting the indication of the UE capability may include operations, features, means, or instructions for transmitting a total number of available processing units, a number of processing units available for each priority class of the set of priority classes, or a combination thereof.

In some examples of the method, apparatuses, and non-transitory computer-readable medium described herein, the set of frequency resources of the radio frequency spectrum band may include a set of CCs, or a set of bands, or a set of band combinations, or a combination thereof.

In some examples of the method, apparatuses, and non-transitory computer-readable medium described herein, receiving the first downlink signal and the second downlink signal may include operations, features, means, or instructions for receiving a first DCI and a second DCI, and communicating the first response signal and the second response signal may include operations, features, means, or instructions for transmitting a first uplink data signal based on the received first DCI and a second uplink data signal based on the received second DCI.

In some examples of the method, apparatuses, and non-transitory computer-readable medium described herein, receiving the first downlink signal and the second downlink signal may include operations, features, means, or instructions for receiving a first DCI and a second DCI, and communicating the first response signal and the second response signal may include operations, features, means, or instructions for receiving a first downlink data signal based on the received first DCI and a second downlink data signal based on the received second DCI.

In some examples of the method, apparatuses, and non-transitory computer-readable medium described herein, receiving the first downlink signal and the second downlink signal may include operations, features, means, or instructions for receiving a first downlink data signal and a second downlink data signal, and communicating the first response signal and the second response signal may include operations, features, means, or instructions for transmitting a first uplink control signal in response to the received first downlink data signal and a second uplink control signal in response to the received second downlink data signal.

In some examples of the method, apparatuses, and non-transitory computer-readable medium described herein, transmitting the indication of the UE capability may include operations, features, means, or instructions for transmitting radio resource control signaling that includes the indication of the UE capability.

A method of wireless communication at a base station is described. The method may include receiving, from a UE, an indication of a UE capability to support a set of priority classes for communications on a set of frequency resources of a radio frequency spectrum band, configuring the UE to operate to communicate traffic according to a set of priority classes of the set of priority classes based on the received indication, transmitting, to the UE, a first downlink signal and a second downlink signal, the second downlink signal following the first downlink signal in time on the set of frequency resources, the first downlink signal of a first priority class of the set of priority classes, and the second downlink signal of a second priority class of the set of priority classes, and communicating, based on the indicated UE capability, a first response signal associated with the first downlink signal and a second response signal associated with the second downlink signal, where the first response signal is communicated following the second response signal.

An apparatus for wireless communication at a base station is described. The apparatus may include a processor, memory in electronic communication with the processor, and instructions stored in the memory. The instructions may be executable by the processor to cause the apparatus to receive, from a UE, an indication of a UE capability to support a set of priority classes for communications on a set of frequency resources of a radio frequency spectrum band, configure the UE to operate to communicate traffic according to a set of priority classes of the set of priority classes based on the received indication, transmit, to the UE, a first downlink signal and a second downlink signal, the second downlink signal following the first downlink signal in time on the set of frequency resources, the first downlink signal of a first priority class of the set of priority classes, and the second downlink signal of a second priority class of the set of priority classes, and communicate, based on the indicated UE capability, a first response signal associated with the first downlink signal and a second response signal associated with the second downlink signal, where the first response signal is communicated following the second response signal.

Another apparatus for wireless communication at a base station is described. The apparatus may include means for receiving, from a UE, an indication of a UE capability to support a set of priority classes for communications on a set of frequency resources of a radio frequency spectrum band, configuring the UE to operate to communicate traffic according to a set of priority classes of the set of priority classes based on the received indication, transmitting, to the UE, a first downlink signal and a second downlink signal, the second downlink signal following the first downlink signal in time on the set of frequency resources, the first downlink signal of a first priority class of the set of priority classes, and the second downlink signal of a second priority class of the set of priority classes, and communicating, based on the indicated UE capability, a first response signal associated with the first downlink signal and a second response signal associated with the second downlink signal, where the first response signal is communicated following the second response signal.

A non-transitory computer-readable medium storing code for wireless communication at a base station is described. The code may include instructions executable by a processor to receive, from a UE, an indication of a UE capability to support a set of priority classes for communications on a set of frequency resources of a radio frequency spectrum band, configure the UE to operate to communicate traffic according to a set of priority classes of the set of priority classes based on the received indication, transmit, to the UE, a first downlink signal and a second downlink signal, the second downlink signal following the first downlink signal in time on the set of frequency resources, the first downlink signal of a first priority class of the set of priority classes, and the second downlink signal of a second priority class of the set of priority classes, and communicate, based on the indicated UE capability, a first response signal associated with the first downlink signal and a second response signal associated with the second downlink signal, where the first response signal is communicated following the second response signal.

Some examples of the method, apparatuses, and non-transitory computer-readable medium described herein may further include operations, features, means, or instructions for determining, based on the received indication of the UE capability, a set of processing units of the UE to support the set of priority classes, each of the set of processing units associated with a respective one of the set of priority classes.

Some examples of the method, apparatuses, and non-transitory computer-readable medium described herein may further include operations, features, means, or instructions for determining, based on the received indication of the UE capability, a scaling factor for communications by the UE for each combination of a set of combinations of the set of priority classes.

Some examples of the method, apparatuses, and non-transitory computer-readable medium described herein may further include operations, features, means, or instructions for determining, for each priority class of the set of priority classes and based on the received indication of the UE capability, a CA capability of the UE associated with the priority class.

In some examples of the method, apparatuses, and non-transitory computer-readable medium described herein, the first priority class may be associated with a first processing timeline, and the second priority class may be associated with a second processing timeline that is shorter than the first processing timeline.

DETAILED DESCRIPTION

Figure 1:
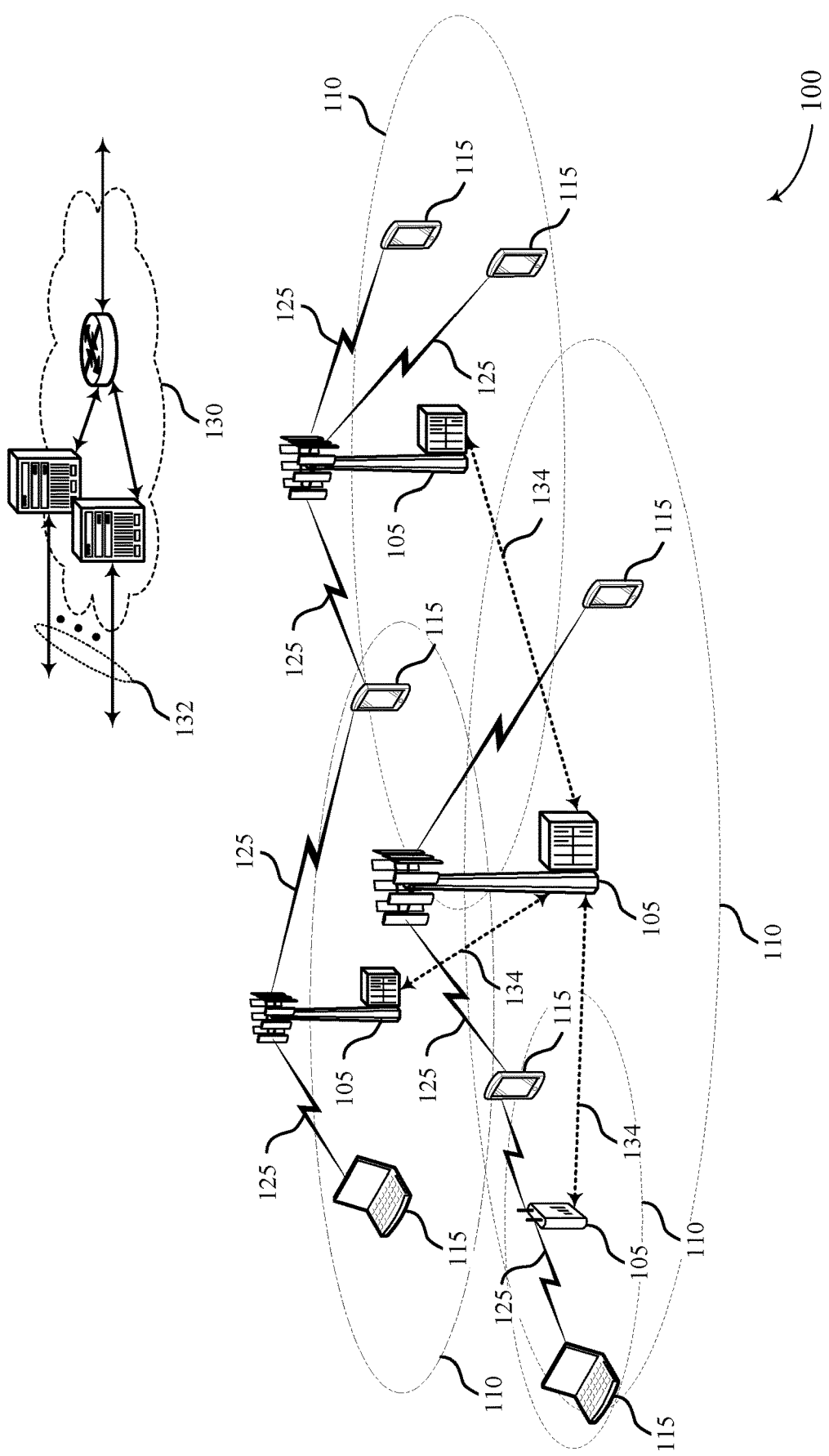
FIG. 1 illustrates an example of a system for wireless communications that supports supporting out-of-order operation in accordance with aspects of the present disclosure.

In some wireless networks, a user equipment (UE) may receive multiple downlink messages on corresponding downlink channels from a base station that include an associated uplink channel for the UE to transmit a corresponding uplink message based on receiving and decoding the downlink message. However, different downlink channels with different priority classes may be received out of order, which may affect an ability of the UE to process the downlink channels. For example, the UE may receive a first downlink channel (e.g., associated with a first priority class) and may receive a second downlink channel (e.g., associated with a second priority class higher than the first priority class) while processing the first downlink channel. As such, the UE may be unable to process both downlink channels simultaneously using configured processing blocks in order to subsequently communicate (e.g., receive subsequent downlink channels and/or transmit subsequent uplink messages) with the base station based on processing the downlink channels. In some cases, the first priority class may include communications with less strict latency, or reliability requirements, or both (e.g., enhanced mobile broadband (eMBB) communications), and the second priority class may include communications with relative stricter latency, or reliability requirements, or both (e.g., ultra-reliable low latency communications (URLLC)). As such, the URLLC may include a higher priority than the eMBB communications based on the more strict latency and reliability requirements compared with the eMBB communications. eMBB and URLLC are discussed herein, but the techniques described herein may be applied, without limitation, by extension to other communication types having different requirements, and thus priorities, such latency or reliability requirements.

The UE and base station may support capability-based solutions for handling an out-of-order operation for processing multiple downlink channels. In some cases, the UE may indicate, to the base station, a number of processing units to support a given priority class of communications with the base station. The base station may then configure the UE to receive and/or transmit channels of different priorities as long as the processing units for a corresponding priority class are not occupied. Additionally or alternatively, the UE may indicate a maximum possible (e.g., maximum supported) data rate per priority class of communications (e.g., based on corresponding scaling factors for each priority level), and the base station may configure the UE to receive and/or transmit channels of different priorities as long as the maximum data rate per priority class is not exceeded. Additionally or alternatively, the UE may indicate different number of component carriers (CCs) (e.g., and a number of spatial layers) that can be used for each priority class of communications, and the base station may configure the UE to receive and/or transmit channels of different priorities on different or the same CCs based on the number of CCs used for each priority class. For example, in some cases, the UE may not be expected to process (e.g., receive, decode) channels that exceed an indicated maximum supported data rate for a given priority class, or channels or component carriers corresponding to the respective priority class, in which case a UE may skip processing (e.g., skip decoding) and indicate that the channels were not successfully decoded.

Aspects of the disclosure are initially described in the context of a wireless communications system. Additionally, aspects of the disclosure are illustrated through an additional wireless communications system, a processing collision, and a process flow. Aspects of the disclosure are further illustrated by and described with reference to apparatus diagrams, system diagrams, and flowcharts that relate to supporting out-of-order operations.

FIG. 1 illustrates an example of a wireless communications system 100 that supports supporting out-of-order operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the milli-meter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may receive multiple downlink channels (e.g., physical downlink shared channels (PDSCHs), physical downlink control channels (PDCCHs), etc.) from a base station 105 in order, where uplink channels (e.g., physical uplink control channels (PUCCHs), physical uplink shared channels (PUSCHs), etc.) or associated downlink channels (e.g., physical downlink shared channels (PDSCHs)) associated with the downlink channels are scheduled in the same order that the downlink channel are received. For example, all of the downlink channels may include a same priority level such that each downlink channel is processed in turn (e.g., separately) for the UE 115 to prepare uplink messages to transmit on the associated uplink channels. That is, when PDSCHs and their associated PUCCHs or PDCCHs and their associated PUSCHs are in order, the UE 115 may pipeline them and process them separately. To process each downlink channel, the UE 115 may use processing blocks for one downlink channel (e.g., and its associated uplink channel) at a time before using the processing blocks to process a subsequent received downlink channel (e.g., and its associated uplink channel). For example, the UE 115 may use the processing blocks for channel estimation, modulation/demodulation, encoding/decoding, etc.

However, in some cases, a downlink channel may need to be processed out of order, resulting in some of the processing blocks being shared for processing multiple downlink channels simultaneously. For example, the UE 115 may receive a first downlink channel (e.g., associated with a first priority) and may receive a second downlink channel (e.g., associated with a second priority higher than the first priority) while processing the first downlink channel. As such, the UE 115 may be in the middle of using the processing blocks for processing the first downlink channel when the second downlink channel is received, and the UE 115 may share the processing blocks to process both channels simultaneously. In some cases, though, the first downlink channel (e.g., the earlier received channel) may be scheduled at an envelope (e.g., maximum) performance for the UE 115 (e.g., coded throughput, number of RBs, number of layers, transport block size (TBS), etc.) that requires a total processing capability of each processing block. Accordingly, the UE 115 may be unable to process the second channel based on processing the first downlink channel using all of the processing blocks and being unable to share them.

Wireless communications system 100 may support efficient techniques for a capability-based solution for handling an out-of-order operation for processing multiple downlink channels. In some cases, a UE 115 may indicate, to a base station 105, a number of uplink channel processing units (e.g., HARQ/PUSCH processing units) needed to support a given priority level of communications with the base station 105. The base station 105 may then configure the UE 115 to receive and/or transmit channels of different priorities as long as the uplink channel processing units for a corresponding priority level are not occupied. Additionally or alternatively, the UE 115 may indicate a maximum possible (e.g., a maximum supported) data rate per priority level of communications (e.g., based on corresponding scaling factors for each priority level, which may be different for different priority levels), and the base station 105 may configure the UE 115 to receive and/or transmit channels of different priorities as long as the maximum data rate per priority level is not exceeded. In some cases, the UE 115 may indicate different number of CCs (e.g., and a number of spatial layers) that can be used for each priority level of communications, and the base station 105 may configure the UE 115 to receive and/or transmit channels of different priorities on different or the same CCs based on the number of CCs used for each priority level. For example, in some cases, the UE 115 may not be expected to process (e.g., receive, decode) channels that exceed an indicated maximum supported data rate for a given priority class, or channels or component carriers corresponding to the respective priority class, in which case a UE 115 may skip processing (e.g., skip decoding) and indicate that the channels were not successfully decoded.

The subject matter described in this disclosure can be implemented to realize one or more potential advantages. One implementation is for a UE 115 to transmit a capability for supporting multiple priority classes for communications with a base station 105, to receive a first downlink signal and then a second downlink signal each associated with a different priority class, and then to communicate with the base station 105 based on the capability and responding to the second downlink signal before the first downlink signal. This implementation can be used to enable the UE 115 to process and respond to the first and second downlink signals out-of-order. In some cases, the UE 115 may process the downlink signals in order, which may increase latency for the second downlink signal. Additionally or alternatively, the UE 115 may refrain from processing the second downlink signal based on receiving the first downlink signal first and not having enough processing capability to process both downlink signals. In some cases, the UE 115 may stop processing the first downlink signal to accommodate the second downlink signal and transmit a negative acknowledgement (NACK) message for the first downlink signal, which may lead the base station 105 to retransmit the first downlink signal. Additionally or alternatively, the UE 115 may share processing units for processing the two downlink signals simultaneously. However, the first downlink signal may be sent with the assumption that all of the processing units are to be used for its processing (e.g., decoding, demodulation, etc.) such that not enough processing units are available for processing the second downlink signal. Accordingly, this implementation may alleviate each of these deficiencies and allow the UE 115 to process the downlink signals simultaneously and out-of-order.

One example of an advantage that allows the UE 115 to process the downlink signals out-of-order may include the UE 115 transmitting an indication of a set of processing units for supporting the different priority classes. Accordingly, the UE 115 may have specific processing units for a first priority class (e.g., according to which the first downlink signal is transmitted) and specific processing units for a second priority class (e.g., according to which the second downlink signal is transmitted) such that if both downlink signals are scheduled to be transmitted to the UE 115, the base station 105 may indicate for the UE 115 to process both downlink signals with their respective processing units.

Additionally or alternatively, the UE 115 may transmit an indication of a scaling factor for each of the priority classes or combinations of the priority classes to enable the out-of-order processing. For example, the different scaling factors may keep a data rate for processing both downlink signals associated with the different priority classes below a maximum data rate supported by the UE 115, thereby allowing the UE 115 to process both downlink signals in parallel (e.g., simultaneously or during at least a portion of the same time) and/or out-of-order. In some cases, the UE 115 may transmit an indication of different CCs for supporting the multiple priority classes. Accordingly, the UE 115 may receive the downlink signals on separate CCs for their respective priority classes based on the indication and then process each downlink signal on their corresponding CCs.

Figure 2:
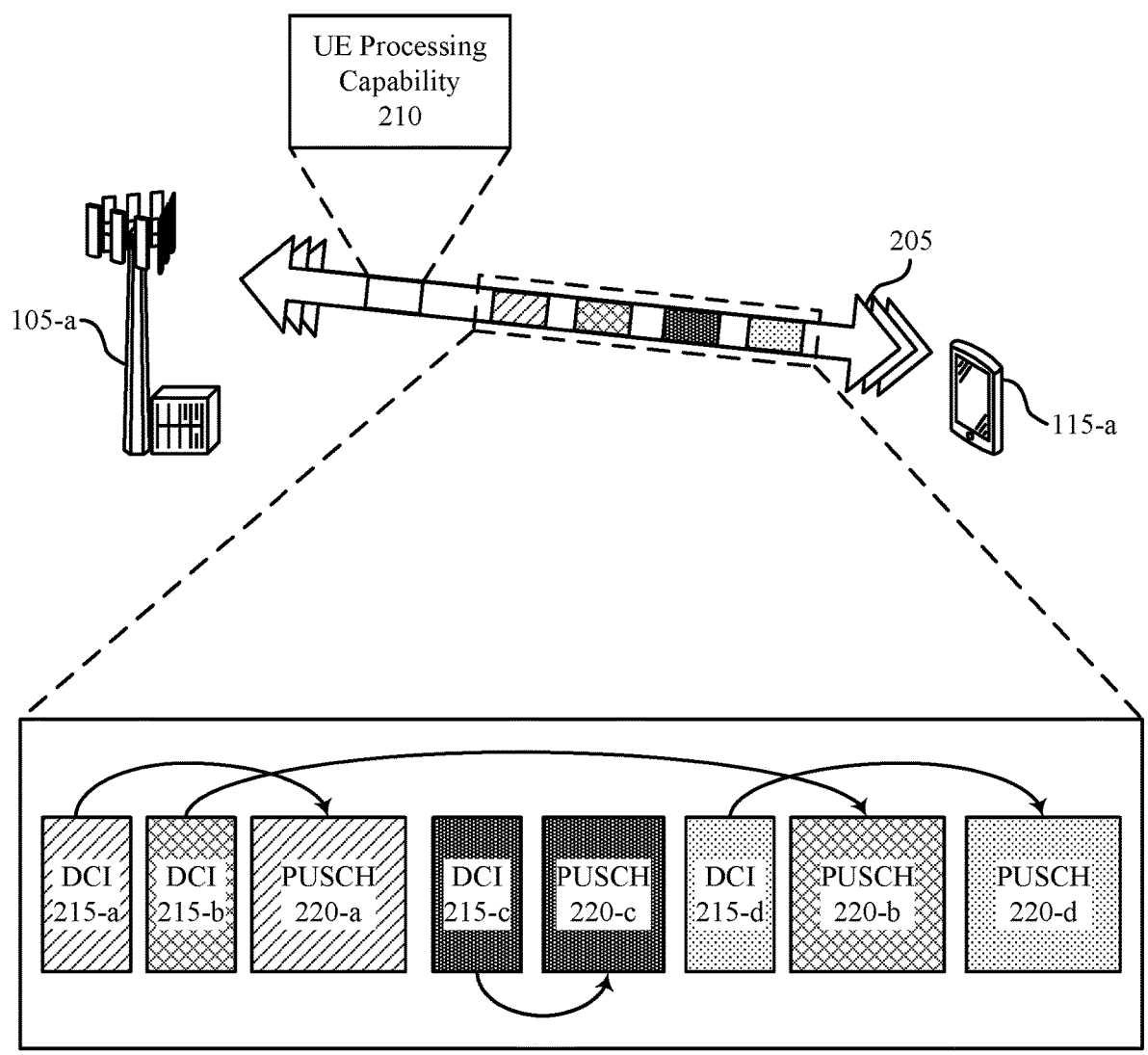
FIG. 2 illustrates an example of a wireless communications system that supports out-of-order operations in accordance with aspects of the present disclosure.

FIG. 2 illustrates an example of a wireless communications system 200 that supports out-of-order operation processing procedures in accordance with aspects of the present disclosure. In some examples, wireless communications system 200 may implement aspects of wireless communications system 100. Wireless communications system 200 may include a UE 115-a and a base station 105-a, which may be examples of a UE 115 and base stations 105, respectively, described with reference to FIG. 1. UE 115-a and base station 105-a may communicate on resources of a carrier 205. In some cases, carrier 205 may include multiple CCs (e.g., in a CA configuration), or UE 115-a and base station 105-a may communicate on multiple carriers simultaneously. Additionally or alternatively, UE 115-a may communicate with multiple base stations 105 (e.g., or multiple cells of a same base station 105) on separate, respective carriers (e.g., or CCs).

As described herein, UE 115-a may be tasked with processing multiple downlink channels in an out-of-order operation. For example, UE 115-a may receive multiple downlink control information (DCI) messages 215 (e.g., in a PDSCH, PDCCH, etc.), where each DCI message 215 includes an associated PUSCH 220 for transmitting uplink messages scheduled by the DCI message 215. As shown, UE 115-a may receive, from base station 105-a, a first DCI message 215-a that is associated with a first PUSCH 220-a, a second DCI message 215-b that is associated with a second PUSCH 220-b, a third DCI message 215-c associated with a third PUSCH 220-c, and a fourth DCI message 215-d associated with a fourth PUSCH 220-d. The first DCI message 215-a, the second DCI message 215-b, and the fourth DCI message 215-d (e.g., and the associated PUSCHs 220) may include a first priority class (e.g., a first priority level or service type, such as eMBB communications) that corresponds to a first processing timeline. Additionally or alternatively, the third DCI message 215-c (e.g., and the associated PUSCH 220-c) may include a second priority class (e.g., a second priority level or service type, such as URLLC) that corresponds to a second processing timeline that is faster than (e.g., shorter in duration than) the first processing timeline. eMBB and URLLC are discussed herein, but the techniques described herein may be applied, without limitation, by extension to other communication types having different requirements, and thus priorities, such latency or reliability requirements.

Based on the different priority classes and the corresponding processing timelines, UE 115-a may process the multiple DCI messages 215 in the out-of-order operation. For example, UE 115-a may receive and process the first DCI message 215-a first to transmit in the first PUSCH 220-a (e.g., when the first DCI message 215-a includes an uplink grant). Then, UE 115-a may receive and begin processing the second DCI message 215-b to transmit in the second PUSCH 220-b, when the third DCI message 215-c is received and UE 115-a needs to process the third DCI message 215-c to transmit in the third PUSCH 220-c (e.g., based on the shorter processing timeline) prior to transmitting in the second PUSCH 220-b. UE 115-a may then finish processing the second DCI message 215-b and transmit in the second PUSCH 220-b. Subsequently, UE 115-a may also receive and process the fourth DCI message 215-d and transmit in the fourth PUSCH 220-d. In some cases, rather than transmitting in an associated PUSCH 220, UE 115-a may receive an associated downlink channel (e.g., PDSCH or PDCCH) after receiving a DCI message 215 (e.g., when a DCI message 215 includes a downlink grant).

When UE 115-a receives the third DCI message 215-c and needs to process the DCI messages out of order, UE 115-a may share processing units for processing the second DCI message 215-b and the third DCI message 215-c simultaneously. However, in some cases, UE 115-a may be unable to process multiple DCI messages 215 at the same time. For example, UE 115-a may drop processing of the second DCI message 215-b to process the third DCI message 215-c instead, or UE 115-a may finish processing the second DCI message 215-b before processing the third DCI message 215-c. In some cases, after processing a respective DCI message 215, UE 115-a may transmit or receive a message according to the out-of-order operation. For example, UE 115-a may transmit an acknowledgment (ACK) feedback message in an uplink channel (e.g., PUSCH 220, PUCCH, etc.) based on receiving and properly decoding a downlink message (e.g., the DCI message 215) or may transmit a separate uplink message based on receiving an uplink grant in a downlink message from base station 105-a. Additionally or alternatively, UE 115-a may receive a downlink channel after receiving a first downlink message or grant (e.g., the DCI message 215) from base station 105-a indicating the subsequent downlink channel.

To accommodate the out-of-order operation and communicate (e.g., transmit or receive) a message with base station 105-a based on processing each initial downlink message (e.g., DCI message 215), UE 115-a may transmit a UE processing capability 210 that base station 105-a can use for configuring UE 115-a to receive and/or transmit channels of different priority class out of order. For example, based on UE processing capability 210, base station 105-a may communicate with UE 115-a with the different priority classes based on UE 115-a being able to accommodate the different priority classes or refrain from communicating with UE 115-a if UE 115-a is able to handle one priority class over the other priority class(es). In some cases, base station 105-a may configure UE 115-a to operate to communicate traffic according a set of priority classes of the multiple priority classes based on UE processing capability 210. For example, the network (e.g., base station 105-a) may configure UE 115-a to operate (e.g., to receive traffic) according to a set of priority classes that UE 115-a has indicated as part of UE processing capability 210 (e.g., or supported within a set of capabilities for UE 115-a).

In some implementations, UE processing capability 210 may include an indication of processing units needed to support different priority classes, where a number of processing units are indicated per priority class. For example, UE 115-a may include a channel state information (CSI) processing unit (CPU) concept, where UE 115-a indicates a number of supported simultaneous CSI calculations, $N_{CPU}$. If UE 115-a supports $N_{CPU}$ simultaneous CSI calculations, UE 115-a may be said to have $N_{CPU}$ CSI processing units for processing CSI reports across all configured cells. Accordingly, if L CPUs are occupied for calculation of CSI reports in a given OFDM symbol, UE 115-*a* may have ($N_{CPU}$–L) unoccupied CPUs. Consequently, if N CSI reports start occupying their respective CPUs on the same OFDM symbol on which ($N_{CPU}$–L) CPUS are unoccupied, where each CSI report n=0, . . . , N–1 corresponds to $O_{CPU}^{(n)}$, UE 115-*a* may not be required to update the (N–M) requested CSI reports with a lowest priority (e.g., priority class), where 0≤M≤N is the largest value such that $\Sigma_{n=0}^{M-1} O_{CPU}^{(n)} \leq$ ($N_{CPU}$–L) holds.

Accordingly, the indication of processing units needed to support different priority classes may be based on the CPU concept. For example, UE 115-*a* may support multiple priority classes (e.g., service types), where the priority classes are visible at the physical (PHY) layer in the form of priority of channels (e.g., PDSCH, PUSCH, PUCCH, etc.) and are indicated to UE 115-*a* by a DCI format, a bit field in a DCI, transmission configuration indication (TCI) state, radio network temporary identifier (RNTI), control resource set (CORESET) index, search space index, etc. Within each priority class, the different transmissions (e.g., downlink receptions and associated uplink transmissions or subsequent downlink receptions) may be in order, but across the different priority classes, the transmissions may be out of order. After receiving the indications of the different priority classes, UE 115-*a* may determine capabilities for supporting the different priority classes.

Per frequency allocation (e.g., CC, band, band combination, etc.), UE 115-*a* may report different parameters in UE processing capability 210 for supporting the different priority classes. For example, UE 115-*a* may report a number of processing units (e.g., HARQ/PUSCH processing units) to support a given priority classes for each of the different priority classes. In some cases, UE 115-*a* may report the number of processing units for each priority class separately or jointly. In some cases, the number of processing units for each priority class may be dependent on a downlink channel (e.g., PDSCH) processing timing capability and an uplink channel (e.g., PUSCH) preparation capability and/or may be dependent on a subcarrier spacing (SCS) for the different priority classes. Additionally or alternatively, the number of processing units for each priority class may be dependent on a number of CORESETs configured, a CORESET length, a number of candidates or control channel elements (CCEs) per slot or per downlink channel (e.g., PDCCH) monitoring span for each priority class. Base station 105-*a* may then configure UE 115-*a* to receive and/or transmit channels of different priority classes as long as the processing units for a corresponding priority class are not occupied.

In some cases, the processing units for the different priority classes may be split into "fast" or "slow" processing units based on the corresponding priority class and an associated latency for the priority class. For example, the first priority class as described herein (e.g., eMBB communications) may use the "slow" processing units that have a longer processing time and include subsequent communications that occur longer after receiving the initial downlink message (e.g., the DCI messages 215). Additionally or alternatively, the second priority class as described herein (e.g., URLLC) may use the "fast" processing units that have a shorter processing time and include subsequent communications that occur shorter after receiving the initial downlink message. Accordingly, UE 115-*a* may determine the number of processing units for each priority class based on which type of processing units (e.g., "fast" or "slow") are needed for upcoming transmissions from base station 105-*a* (e.g., as indicated by the DCI format, the bit field in the DCI, the TCI state, the RNTI, the CORESET index, search space index, etc., as described herein).

Additionally or alternatively, in some implementations, UE 115-*a* may include an indication of different scaling factors (e.g., per CC) to account for support of the different priority classes (e.g., different channel priorities) based on keeping a data rate for UE 115-*a* below a maximum possible data rate to be handled by UE 115-*a*. UE 11-*a* may compute or be given a maximum data rate across a given band or band combination. In some cases, the maximum data rate may include or be otherwise associated with a parameter, f, given by an RRC parameter, scalingFactor, which is reported by UE 115-*a* per CC. For some wireless communications systems (e.g., NR), the approximate data rate for a given number of aggregated carriers (e.g., CCs) in a band or a band combination may be computed as follows in Equation 1.

$$\text{data rate (in megabits per second (Mbps))} = \qquad (1)$$
$$10^{-6} \times \sum_{j=1}^{J} \left( v_{Layers}^{(j)} \times Q_m^{(j)} \times f^{(j)} \times R_{max} \times \frac{N_{PRB}^{BW(j),\mu} \times 12}{T_s^{\mu}} \times (1 - OH^{(j)}) \right)$$

For Equation 1, J may be the number of aggregated CCs in a band or band combination; $R_{max}$=948/1024; and for the j-th CC: $v_{Layers}^{(j)}$ may be the maximum number of supported layers given by a higher layer parameter for downlink (e.g., maxNumberMIMO-LayersPDSCH) and the maximum of higher layer parameters for uplink (e.g., maxNumberLayersCB-PUSCH and maxNumberMIMO-LayersNonCB-PUSCH); $Q_m^{(j)}$ may be the maximum supported modulation order given by a higher layer parameter for downlink (e.g., supportedModulationOrderDL) and a higher layer parameter for uplink (e.g., supportedModulationOrderUL); $f^{(j)}$ may be the scaling factor given by a higher layer parameter (e.g., scalingFactor) and can take the values 1, 0.8, 0.75, and 0.4; μ may be the numerology of the j-th CC; $T_s^{\mu}$ may be the average OFDM symbol duration in a subframe for numerology $$\mu \left( \text{e.g., } T_s^{\mu} = \frac{10^{-3}}{14 \times 2^{\mu}} \right)$$

and normal cyclic prefix is assumed); $N_{PRB}^{BW(j),\mu}$ may be the maximum RB allocation in bandwidth $BW^{(j)}$ with numerology μ, where $BW^{(j)}$ may be the UE supported maximum bandwidth in the given band or band combination; and $OH^{(j)}$ may be the overhead and can take the following values: 0.14 for a first frequency range (FR1) for downlink, 0.18 for a second frequency range (FR2) for downlink, 0.08 for FR1 for uplink, or 0.10 for FR2 for uplink. As a note, one of an uplink or a supplementary uplink (SUL) carrier (e.g., the one with the higher data rate) may be counted for a cell operating an SUL. In some examples, an approximate maximum data rate may be computed as a maximum of the approximate data rates computed using Equation 1 for each of the supported band or band combinations.

Once the maximum data rate across an aggregated carrier of a band or band combination is calculated, base station 105-*a* may distribute the maximum data rate in any way across the different carriers (e.g., CCs). At a high level, a maximum rate per CC may not be what is computed by the inner part of the summation in Equation 1. For example, some CCs may have a larger data rate and some CCs may have a lower data rate, but the maximum data rate may be satisfied. Accordingly, base station 105-a may satisfy the maximum data rate by distributing different scaling factors (e.g., f) across the CCs. For example, for a band with two (2) CCs, UE 115-a may report a first scaling factor (f1) of 0.4 and a second scaling factor (f2) of 0.75, and the maximum data rate in that band may then be computed using the reported scaling factors. Base station 105-a may then distribute the calculated maximum data rate across the two (2) CCs in a way that is equivalent to a larger f1 and a lower f2 (e.g., f2 may even become zero (0)).

For an out-of-order operation, base station 105-a may keep the data rate for each priority class below the maximum possible data rate to be handled by UE 115-a. Accordingly, UE 115-a may report different f values per CC to account for the support of the different priority classes. For example, UE 115-a may report a $f_{x,c}$ for a first priority class, x, on CC c, a $f_{y,c}$ for a second priority class, y, on CC c, a $f_{x,y,c}$ for supporting both priority classes on CC c, or a combination thereof. In some cases, $f_{x,c}$ and $f_{y,c}$ may be reported as one value or separately as shown above based on different priority classes having different processing loads. In some examples, scaling factors for different priority classes may be selected from different sets of values. In some cases, the reported values per priority may be different for different timing capabilities.

Additionally or alternatively, in some implementations, UE 115-a may report a CA capability in UE processing capability 210 to support an out-of-order operation for processing different priority classes. For example, UE 115-a may report a number of CCs per band or band combination that can support a first priority class x only, a number of CCs that can support a second priority classy only, and a number of CCs that can support both priority classes x and y. As an example, UE 115-a may support four (4) CCs for the first priority class only (e.g., eMBB), two (2) CCs for the second priority class only (e.g., URLLC), and in case UE 115-a may be configured with both low and high priority classes, then UE 115-a may support two (2) CCs for the first priority class (e.g., eMBB) and one (1) CC for the second priority class (e.g., URLLC). Assuming the case where UE 115-a is configured with both priority classes, UE 115-a may be configured with a first CC (e.g., CC0) and a second CC (e.g., CC1) for the first priority class and the second priority class, respectively, or CC0 for the first priority class only and CC1 for both priority classes. In such a case, on CC1, the two priority classes may be out of order. However, within a priority class, transmissions may all be in order.

In some cases, if UE 115-a does not support CA (e.g., uplink CA), UE 115-a may still support the out-of-order operation (e.g., low and high priority class transmissions on one CC). For example, UE 115-a (e.g., and any other users, UEs 115, etc.) may report their own CA capability, MIMO capability (e.g., number of layers), maximum modulation order supported, maximum number of RBs supported, or a combination thereof. As an example, assuming the first two parameters, UE 115-a may report a support of four (4) CCs for the first priority class only and X layers; two (2) CCs for the second priority class only and Y layers; and, in case UE 115-a is configured with both low and high priority classes, then UE 115-a may support two (2) CCs for the first priority class and one (1) CC for the second priority class, both with Z layers, where Z may further be split and reported as Z1 layers for the first priority class and Z2 layers for the second priority class. As another example, if UE 115-a supports only one CC, UE 115-a may report (e.g., in UE processing capability 210) the other parameters such that UE 115-a may be sure that in case both priority classes (e.g., eMBB and URLLC) are configured and scheduled on a given CC, then a maximum data rate may be met.

After UE 115-a indicates UE processing capability 210, base station 105-a may signal to UE 115-a that UE processing capability 210 will be used for upcoming communications. For example, UE 115-a may first identify the processing capabilities as discussed above and transmit these capabilities to base station 105-a. However, UE 115-a may not implement the capabilities until base station 105-a signals for UE 115-a to do so. As such, if UE 115-a does not receive the signaling from base station 105-a implementing UE processing capability 210, UE 115-a may assume that subsequent transmissions received from base station 105-a may include a same priority class and can be handled in order. Additionally or alternatively, if base station 105-a does signal for UE 115-a to implement UE processing capability 210, UE 115-a may then assume that subsequent transmissions received from base station 105-a may include different priority classes and can be handled out-of-order based on the different implementations described herein (e.g., based on the processing units, maximum data rate and scaling factors, number of CCs, etc.). In some cases, base station 105-a may configure UE 115-a with the out-of-order operation to handle each communications based on UE processing capability 210.

Figure 3:
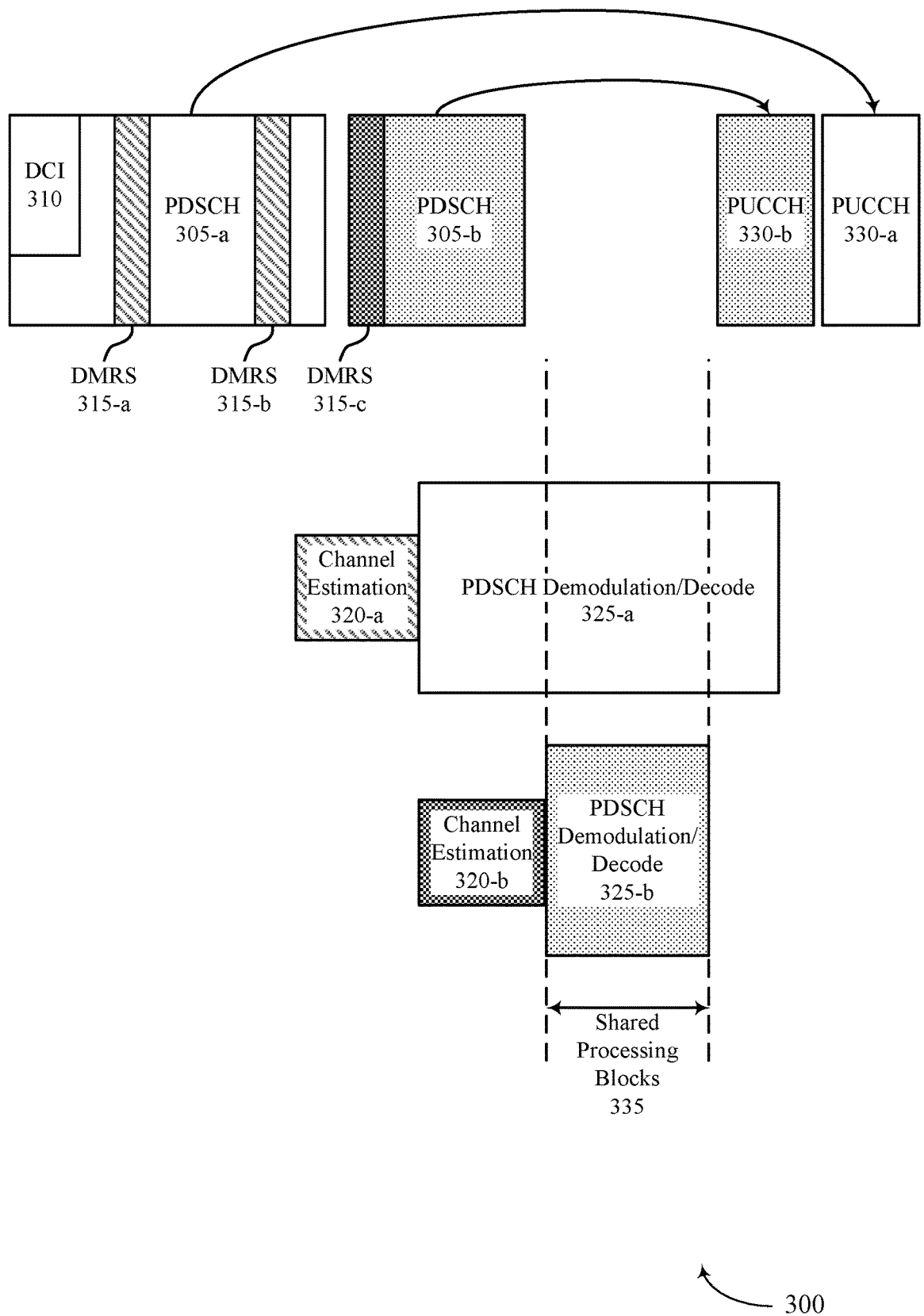
FIG. 3 illustrates an example of a processing collision that supports out-of-order operations in accordance with aspects of the present disclosure.

FIG. 3 illustrates an example of a processing collision 300 that supports out-of-order operation processing procedures in accordance with aspects of the present disclosure. In some examples, processing collision 300 may implement aspects of wireless communications systems 100 and/or 200. As described herein, a UE 115 and a base station 105 may communicate based on an out-of-order operation.

As shown, the UE 115, from the base station 105, may receive a first PDSCH 305-a and then a second PDSCH 305-b (e.g., or different downlink channels/messages). In some examples, the UE 115 may first process the first PDSCH 305-a and communicate with the base station 105 (e.g., transmit or receive messages to or from the base station 105) based on information included in the first PDSCH 305-a. Then, the UE 115 may process the second PDSCH 305-b and communicate with the base station 105 based on information included in the second PDSCH 305-b. However, as described herein, the second PDSCH 305-b may be associated with a different priority class than the first PDSCH 305-a, which may affect the processing and subsequent communications. For example, the first PDSCH 305-a may be associated with a first priority class (e.g., eMBB) that is lower than a second priority class (e.g., URLLC) for the second PDSCH 305-b. As such, the UE 115 may attempt to process both PDSCHs 305 simultaneously or drop processing of one PDSCH 305 in favor of the other.

As shown, the first PDSCH 305-a may also include a DCI 310 that includes control information that indicates a first PUCCH 330-a for the UE 115 to respond to the first PDSCH 305-a in (e.g., by transmitting an ACK message indicating the first PDSCH 305-a is received and decoded properly). In some examples, the first PDSCH 305-a may include a demodulation reference signal (DMRS) 315-a and 315-b to assist the UE 115 with demodulating the information in the first PDSCH 305-a and ensuring the decoding is successful. After the second DMRS 315-b is received, the UE 115 may begin a channel estimation 320-a and then a PDSCH demodulation/decode 325-a for the first PDSCH 305-a.

However, while performing the PDSCH demodulation/decode 325-a, the UE 115 may receive the second PDSCH 305-*b*, which also includes a DMRS 315-*c*. After receiving the DMRS 315-*c* at the beginning of the second PDSCH 305-*b*, the UE 115 may perform a channel estimation 320-*b* and then a PDSCH demodulation/decode 325-*b*. In some cases, any processing blocks used for channel estimation may first be used to perform the channel estimation 320-*a* and then for the channel estimation 320-*b* based on the timings that each PDSCH 305 and corresponding DMRSs 315 are received by the UE 115. Additionally or alternatively, the two channel estimations 320 may overlap, and the UE 115 may need to share processing units to perform both channel estimations 320.

As described herein, based on the different priority classes and the order in which the two PDSCHs 305 are received, the UE 115 may perform an out-of-order operation to process each PDSCH 305 in order to transmit on an associated PUCCH 330 (e.g., or receive a subsequent downlink channel). For example, the UE 115 may have to use one or more shared processing blocks 335 to perform PDSCH demodulations/decodes 325-*a* and 325-*b* to transmit on PUCCHs 330-*a* and 330-*b*, respectively. However, the first PDSCH 305-*a* may require a total processing capability of the UE 115, thereby limiting the ability of the UE 115 to process the second PDSCH 305-*b* and transmit in the PUCCH 330-*b*.

To accommodate the out-of-order operation, as described with reference to FIG. 2, the UE 115 may indicate a processing capability to the base station 105 to enable the base station 105 to configure the UE 115 to transmit and/or receive communications based on the different priority classes that the UE 115 supports. For example, the UE 115 may indicate, to the base station 105, a number of processing units (e.g., HARQ/PUSCH processing units) needed to support a given priority class of communications with the base station 105. The base station 105 may then configure the UE 115 to receive and/or transmit channels of different priorities as long as the processing units for a corresponding priority class are not occupied. Additionally or alternatively, the UE 115 may indicate a maximum possible data rate per priority class of communications (e.g., based on corresponding scaling factors for each priority level), and the base station 105 may configure the UE 115 to receive and/or transmit channels of different priorities as long as the maximum data rate per priority class is not exceeded. In some cases, the UE 115 may indicate different number of CCs (e.g., and a number of layers) that can be used for each priority class of communications, and the base station 105 may configure the UE 115 to receive and/or transmit channels of different priorities on different or the same CCs based on the number of CCs used for each priority class.

Figure 4A:
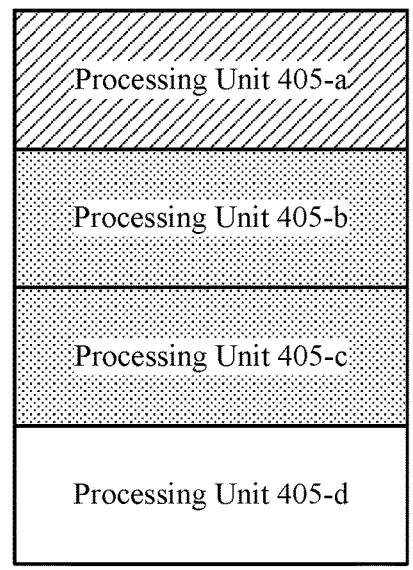
FIG. 4A illustrates an example of a processing unit allocation that supports out-of-order operations in accordance with aspects of the present disclosure.

FIG. 4A illustrates an example of a processing unit allocation 400 that supports out-of-order operation processing procedures in accordance with aspects of the present disclosure. In some examples, processing unit allocation 400 may implement aspects of wireless communications systems 100 and/or 200. As described herein, in some implementations, a UE 115 and/or a base station 105 may include a number of processing units 405, including at least processing units 405-*a*, 405-*b*, 405-*c*, and 405-*d*, and communicate based on an out-of-order operation using processing unit allocation 400.

For example, in a given band (e.g., or CC, band combination, frequency allocation, etc.), the UE 115 may report a total available number of processing units 405, a number of processing units 405 for a first priority class (e.g., eMBB), and a number of processing units 405 for a second priority class (e.g., URLLC). As shown, the total number of available processing units 405 may be four (4) with processing units 405-*a*, 405-*b*, 405-*c*, and 405-*d*. In some examples, the UE 115 may indicate the number of processing units 405 for the first priority class is one (1) (e.g., processing unit 405-*a*) and the number of processing units 405 for the second priority class is two (2) (e.g., processing units 405-*b* and 405-*c*). Accordingly, if the given band has four CCs, base station 105-*a* may configure UE 115-*a* with the first priority class on all CCs, two (2) CCs with the first priority class, and one (1) CC with the second priority class, or a combination thereof. For the two (2) CCs with the first priority class and the one (1) CC with the second priority class, a first CC (e.g., CC0) and a second CC (e.g., CC1) may be configured with the first priority, and the first CC (e.g., CC0) may be configured with the second priority. On the first CC (e.g., CC0), both channels of the different priority classes may be running, and they may be out of order. Accordingly, UE 115-*a* may process all channels using the respective processing units 405 for each priority class.

In some cases, the base station 105 may indicate for the UE 115 to process upcoming downlink messages (e.g., or channels) based on the processing units 405 for the priority classes with which each downlink message is transmitted according to. If the base station 105 does not transmit this indication, the UE 115 may process any upcoming downlink message using all available processing units 405 regardless of which priority class the processing units 405 support.

Figure 4B:
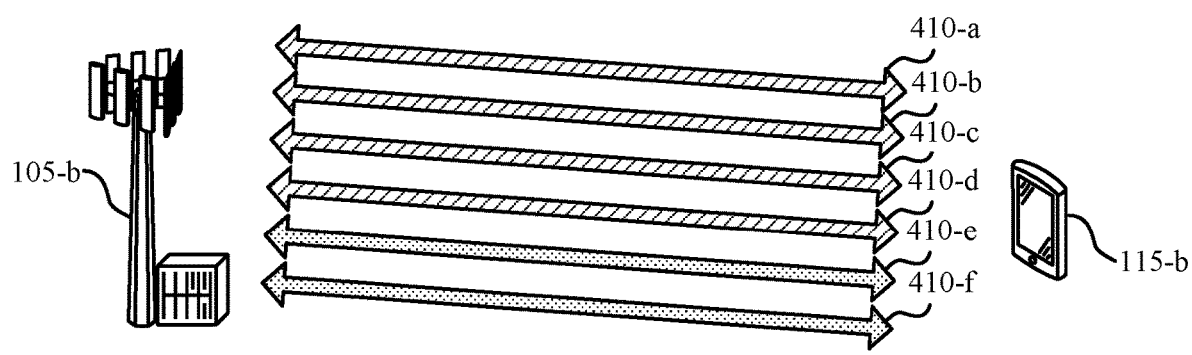
FIG. 4B illustrates an example of a component carrier (CC) allocation that supports out-of-order operations in accordance with aspects of the present disclosure.

FIG. 4B illustrates an example of a CC allocation 401 that supports out-of-order operation processing procedures in accordance with aspects of the present disclosure. In some examples, CC allocation 401 may implement aspects of wireless communications systems 100 and/or 200. CC allocation 401 may include a UE 115-*b* and a base station 105-*b*, which may be examples of corresponding UEs 115 and base stations 105, respectively, as described with reference to FIGS. 1-4A. As described herein, in some implementations, UE 115-*b* and base station 105-*b* may communicate based on an out-of-order operation using CC allocation 401.

In some cases (e.g., as described with reference to FIG. 2), UE 115-*a* may report a number of CCs 410 per band or band combination that can support a first priority class x only, a number of CCs 410 that can support a second priority classy only, and a number of CCs 410 that can support both priority classes x and y. As shown, UE 115-*b* may support four (4) CCs 410 for the first priority class only (e.g., eMBB) with CCs 410-*a*, 410-*b*, 410-*c*, and 410-*d*. In some examples, UE 115-*b* may support two (2) CCs 410 for the second priority class only (e.g., URLLC) with CCs 410-*e* and 410-*f*. In some cases, UE 115-*b* may be configured with both low and high priority classes (e.g., UE 115-*b* can support both the first and second priority classes). Accordingly, UE 115-*b* may support two (2) CCs 410 for the first priority class (e.g., eMBB) and one (1) CC 410 for the second priority class (e.g., URLLC). Assuming the case where UE 115-*b* is configured with both priority classes, UE 115-*b* may be configured with a first CC 410 (e.g., CC0 or CC 410-*a*) and a second CC 410 (e.g., CC1 or CC 410-*b*) for the first priority class and the second priority class, respectively. Additionally or alternatively, UE 115-*b* may be configured with the first CC 410 for the first priority class only and the second CC 410 for both priority classes. In such a case, on the second CC 410, the two priority classes may be received out of order. However, within a priority class, transmissions may all be in order.

In some cases, if UE 115-*b* does not support CA (e.g., uplink CA), UE 115-*b* may still support the out-of-order operation (e.g., low and high priority class transmissions on one CC 410). For example, UE 115-*b* (e.g., and any other users, UEs 115, etc.) may report their own CA capability, MIMO capability (e.g., number of layers), maximum modulation order supported, maximum number of RBs supported, or a combination thereof. As an example, assuming the first two parameters (e.g., CA capability and MIMO capability with the supported number of layers), UE 115-*b* may report a support of four (4) CCs 410 for the first priority class only (e.g., CCs 410-*a*, 410-*b*, 410-*c*, and 410-*d*) and X layers; two (2) CCs 410 for the second priority class only (e.g., CCs 410-*e* and 410-*f*) and Y layers; and, in case UE 115-*b* is configured with both low and high priority classes, then UE 115-*b* may support two (2) CCs 410 for the first priority class and one (1) CC 410 for the second priority class, both with Z layers, where Z may further be split and reported as Z1 layers for the first priority class and Z2 layers for the second priority class. As another example, if UE 115-*b* supports only one CC 410, UE 115-*b* may report (e.g., in UE capability report) the other parameters (e.g., maximum modulation order supported, maximum number of RBs supported, etc.) such that UE 115-*b* may be sure that in case both priority classes (e.g., eMBB and URLLC) are configured and scheduled on a given CC 410, then a maximum data rate may be met or not exceeded.

Figure 5:
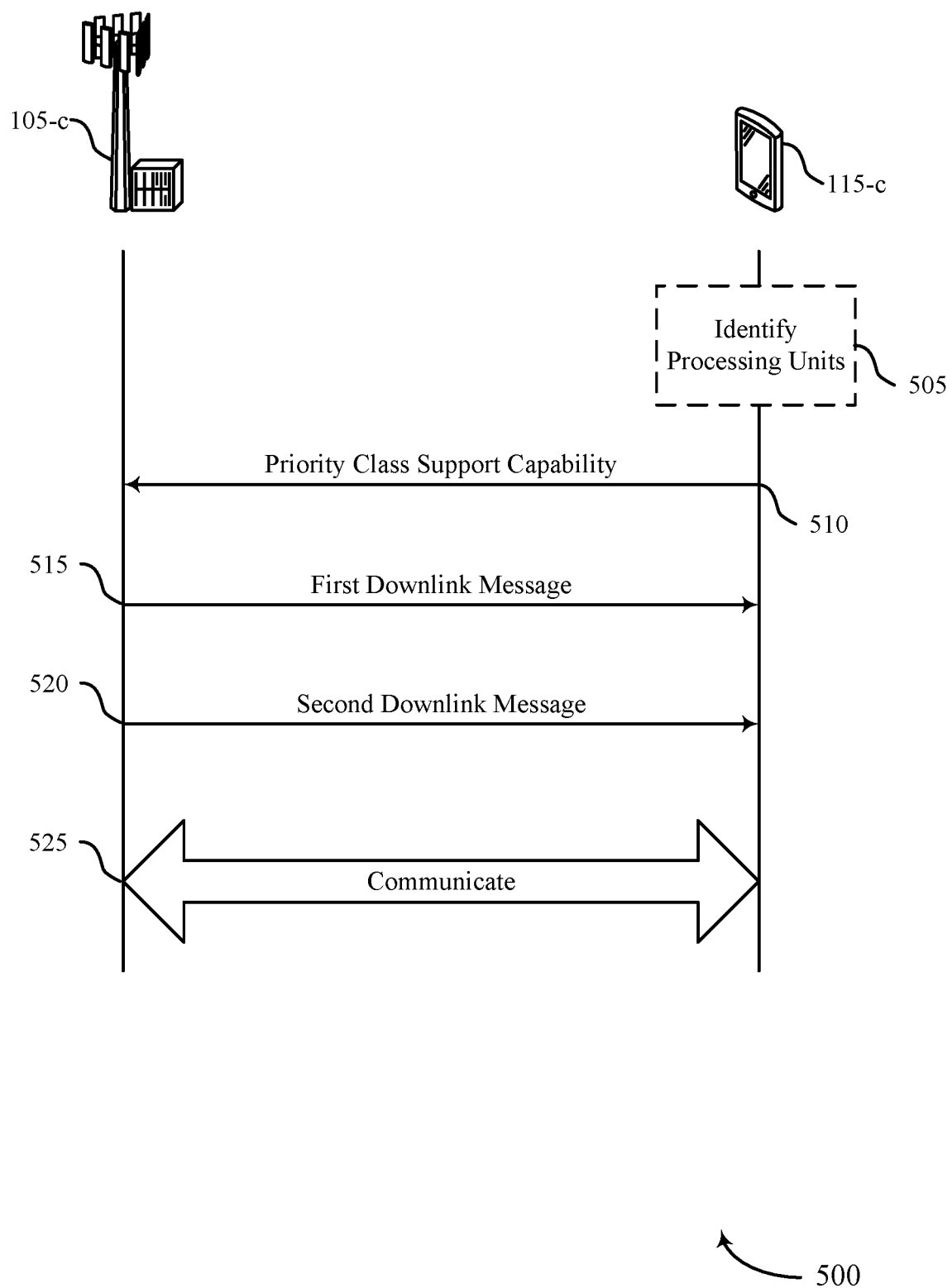
FIGS. 5, 6, and 7 illustrate examples of process flows that support out-of-order operations in accordance with aspects of the present disclosure.

FIG. 5 illustrates an example of a process flow 500 that supports out-of-order operation processing procedures in accordance with aspects of the present disclosure. In some examples, process flow 500 may implement aspects of wireless communications systems 100 and/or 200. Process flow 500 may include a UE 115-*c* and a base station 105-*c*, which may be examples of UEs 115 and base stations 105 described with reference to FIGS. 1-4B.

In the following description of the process flow 500, the operations between UE 115-*c* and base station 105-*c* may be transmitted in a different order than the order shown, or the operations performed by base station 105-*c* and UE 115-*c* may be performed in different orders or at different times. Some operations may also be left out of the process flow 500, or other operations may be added to the process flow 500. It is to be understood that while base station 105-*c* and UE 115-*c* are shown performing a number of the operations of process flow 500, any wireless device may perform the operations shown.

At 505, UE 115-*c* may identify a set of processing units of UE 115-*c* to support multiple priority classes, each of the set of processing units associated with a respective one of the multiple priority classes.

At 510, UE 115-*c* may transmit, to base station 105-*c*, an indication of a UE capability to support the multiple priority classes for communications on a frequency resource of a radio frequency spectrum band. In some cases, the set of frequency resources of the radio frequency spectrum band may include a set of CCs, or a set of bands, or a set of band combinations, or a combination thereof. In some examples, UE 115-*c* may identify the UE capability per CC, or per band, or per band combination, or a combination thereof. In some cases, UE 115-*c* may transmit RRC signaling that includes the indication of the UE capability. Accordingly, the indication of the UE capability may include an indication of the identified set of processing units of UE 115-*c*. In some examples, UE 115-*c* may transmit a total number of available processing units, a number of processing units available for each priority class of the multiple priority classes, or a combination thereof with the UE capability.

In some cases, base station 105-*c* may configure UE 115-*c* to operate (e.g., to communicate traffic) according to a set of priority classes of the multiple priority classes based on the received indication. For example, the network (e.g., base station 105-*c*) may configure UE 115-*c* to operate to receive traffic according to a set of priority classes that UE 115-*c* has indicated as part of the UE capability (e.g., or supported within a set of capabilities for UE 115-*c*).

At 515 and 520, UE 115-*c* may receive, from base station 105-*c*, a first downlink signal and a second downlink signal, the second downlink signal following the first downlink signal in time on the frequency resource. In some cases, the first downlink signal may include a first priority class (e.g., eMBB) of the multiple priority classes, and the second downlink signal may include a second priority class (e.g., URLLC) of the multiple priority classes. In some cases, UE 115-*c* may receive, for each of the first downlink signal and the second downlink signal, an indication of a priority class of the multiple priority classes associated with the downlink signal. For example, the received indication of the priority class may include a DCI format, or a DCI bit, or a TCI state, or n RNTI, or a CORESET index, or a search space index, or a combination thereof, of the downlink signal. In some cases, transmissions associated with the first priority class may be in order relative to other transmissions of the first priority class, and transmissions associated with the second priority class may be in order relative to other transmissions of the second priority class.

In some cases, in response to the transmitted indication of the UE capability, UE 115-*c* may receive, from base station 105-*c*, an indication that the UE capability is to be used (e.g., based on the identified processing units), where the first downlink signal, or the second downlink signal, or the first response signal, or the second response signal, or a combination thereof, are received based on the received indication that the UE capability is to be used.

At 525, UE 115-*c* and base station 105-*c* may communicate, based on the indicated UE capability transmitted at 510, a first response signal associated with the first downlink signal and a second response signal associated with the second downlink signal, where the first response signal is communicated following the second response signal (e.g., out-of-order).

In some cases, receiving the first downlink signal and the second downlink signal may include UE 115-*c* receiving a first DCI and a second DCI, and UE 115-*c* may communicate the first response signal and the second response signal by transmitting a first uplink data signal based on the received first DCI and a second uplink data signal based on the received second DCI.

Additionally or alternatively, UE 115-*c* may receive a first DCI and a second DCI, and UE 115-*c* may communicate the first response signal and the second response signal with base station 105-*c* by receiving a first downlink data signal based on the received first DCI and a second downlink data signal based on the received second DCI.

In some cases, UE 115-*c* may receive a first downlink data signal and a second downlink data signal and may communicate the first response signal and the second response signal with base station 105-*c* by transmitting a first uplink control signal in response to the received first downlink data signal and a second uplink control signal in response to the received second downlink data signal.

Figure 6:
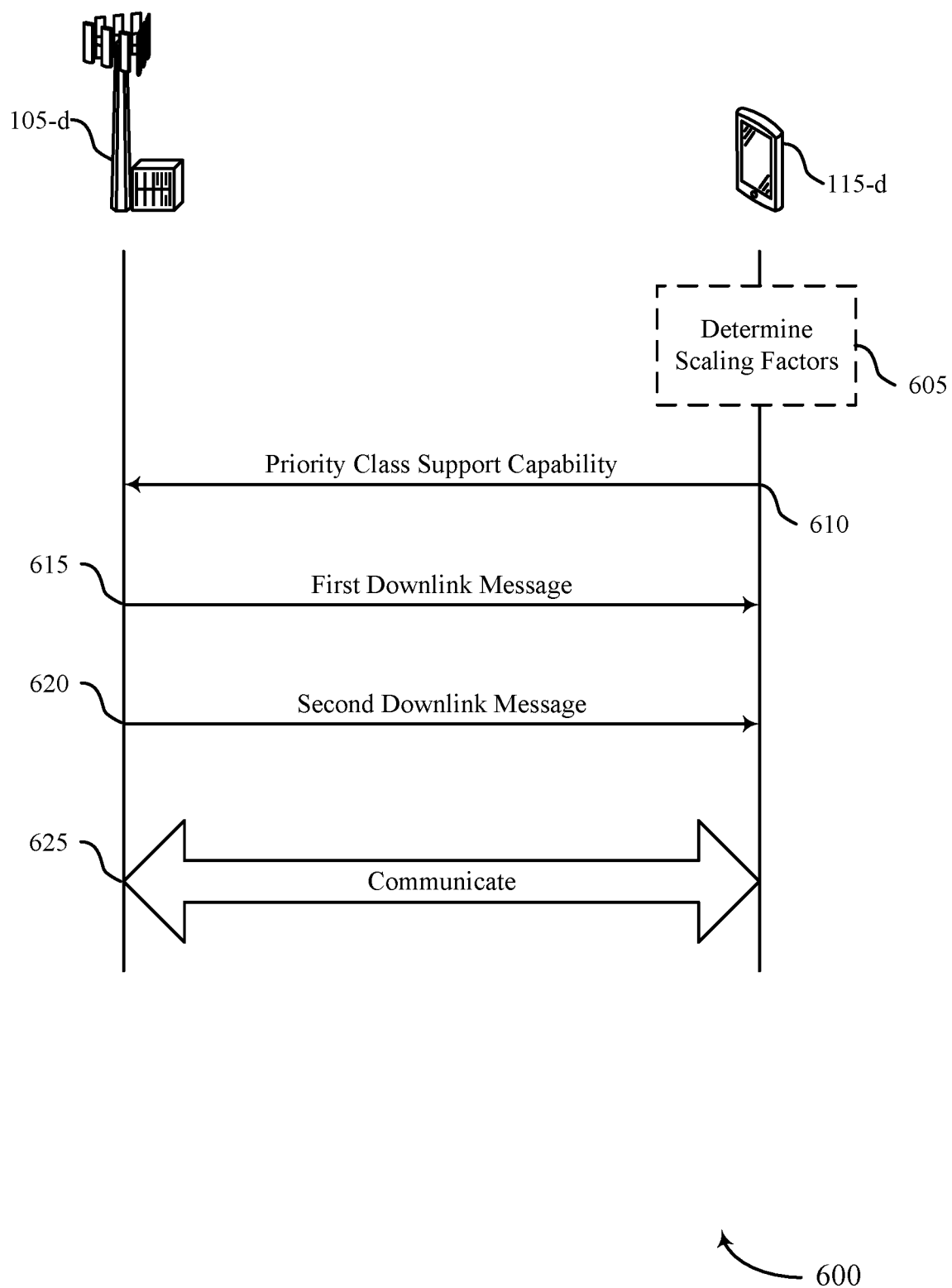

FIG. 6 illustrates an example of a process flow 600 that supports out-of-order operation processing procedures in accordance with aspects of the present disclosure. In some examples, process flow 600 may implement aspects of wireless communications systems 100 and/or 200. Process flow 600 may include a UE 115-*d* and a base station 105-*d*, which may be examples of a UE 115 and base stations 105 described with reference to FIGS. 1-5.

In the following description of the process flow 600, the operations between UE 115-*d* and base station 105-*d* may be transmitted in a different order than the order shown, or the operations performed by base station 105-*d* and UE 115-*d* may be performed in different orders or at different times. Some operations may also be left out of the process flow 600, or other operations may be added to the process flow 600. It is to be understood that while base station 105-*d* and UE 115-*d* are shown performing a number of the operations of process flow 600, any wireless device may perform the operations shown.

At 605, UE 115-*d* may identify a set of combinations of the multiple priority classes, each combination of the set of combinations including one or more priority classes of the multiple priority classes. In some cases, UE 115-*d* then may determine, for each combination of the set of combinations, a scaling factor for communications by UE 115-*d* based on a maximum data rate for communications by UE 115-*d*.

At 610, similar to process flow 500 as described above with reference to FIG. 5, UE 115-*d* may transmit, to base station 105-*d*, an indication of a UE capability to support the multiple priority classes for communications on a frequency resource of a radio frequency spectrum band. However, as described with respect to process flow 600, the indication of the UE capability may include an indication of the determined scaling factors. Accordingly, 615, 620, and 625 may then be performed similar to the corresponding operations as described above with reference to FIG. 5.

Figure 7:
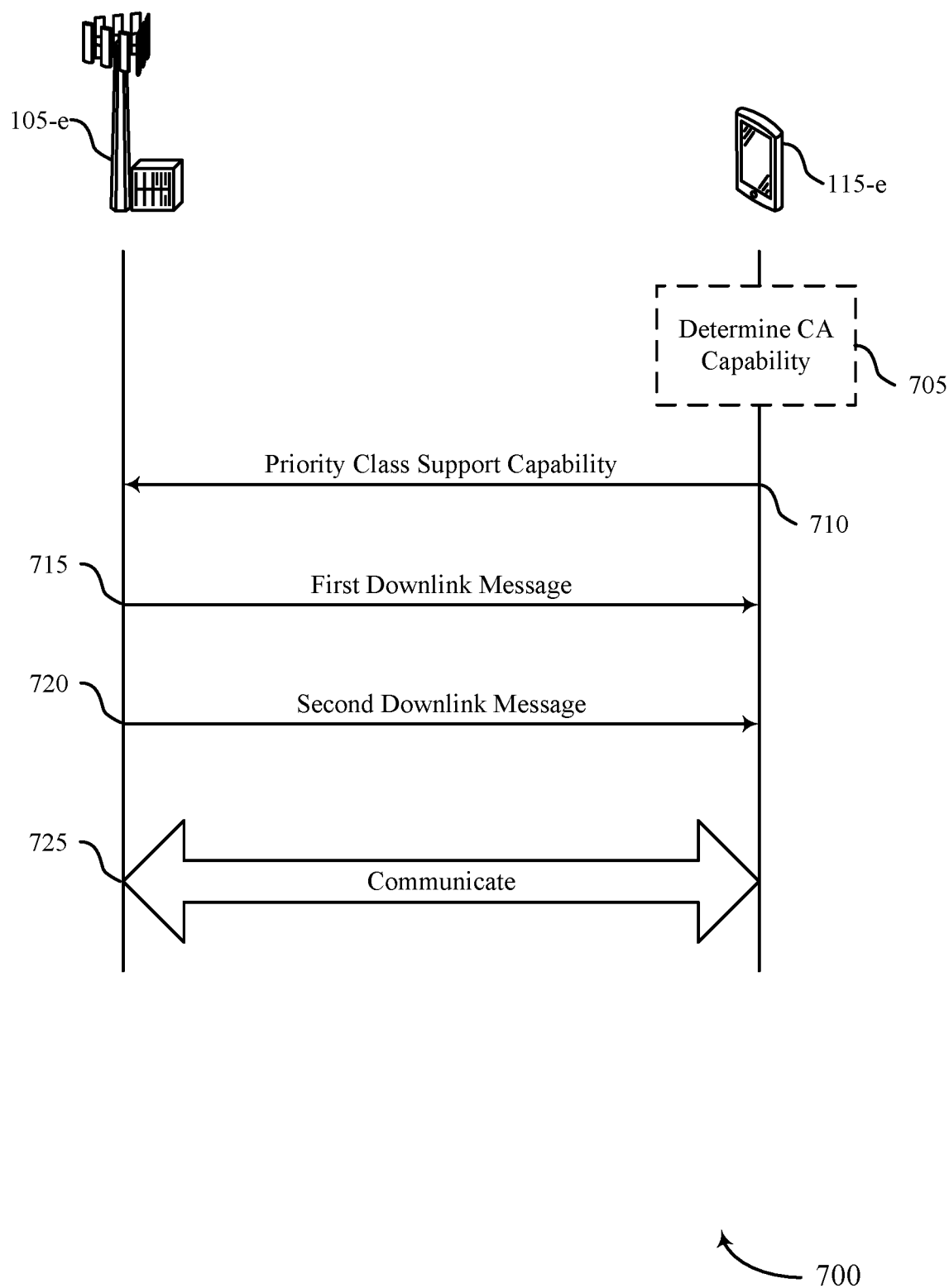

FIG. 7 illustrates an example of a process flow 700 that supports out-of-order operation processing procedures in accordance with aspects of the present disclosure. In some examples, process flow 700 may implement aspects of wireless communications systems 100 and/or 200. Process flow 700 may include a UE 115-*e* and a base station 105-*e*, which may be examples of a UE 115 and base stations 105 described with reference to FIGS. 1-6.

In the following description of the process flow 700, the operations between UE 115-*e* and base station 105-*e* may be transmitted in a different order than the order shown, or the operations performed by base station 105-*e* and UE 115-*e* may be performed in different orders or at different times. Certain operations may also be left out of the process flow 700, or other operations may be added to the process flow 700. It is to be understood that while base station 105-*e* and UE 115-*e* are shown performing a number of the operations of process flow 700, any wireless device may perform the operations shown.

At 705, UE 115-*e* may determine, for each priority class of the multiple priority classes, a CA capability of UE 115-*e* associated with the priority class.

At 710, similar to process flows 500 and 600 as described above with reference to FIGS. 5 and 6, UE 115-*e* may transmit, to base station 105-*e*, an indication of a UE capability to support the multiple priority classes for communications on a frequency resource of a radio frequency spectrum band. However, as described with respect to process flow 700, the indication of the UE capability may include an indication of the determination of the CA capability of UE 115-*e*. In some cases, the indication of the UE capability may further include a MIMO capability, or a maximum modulation order, or a maximum number of resource blocks, or a combination thereof. Accordingly, 715, 720, and 725 may then be performed similar to the corresponding operations as described above with reference to FIGS. 5 and 6.

Figure 8:
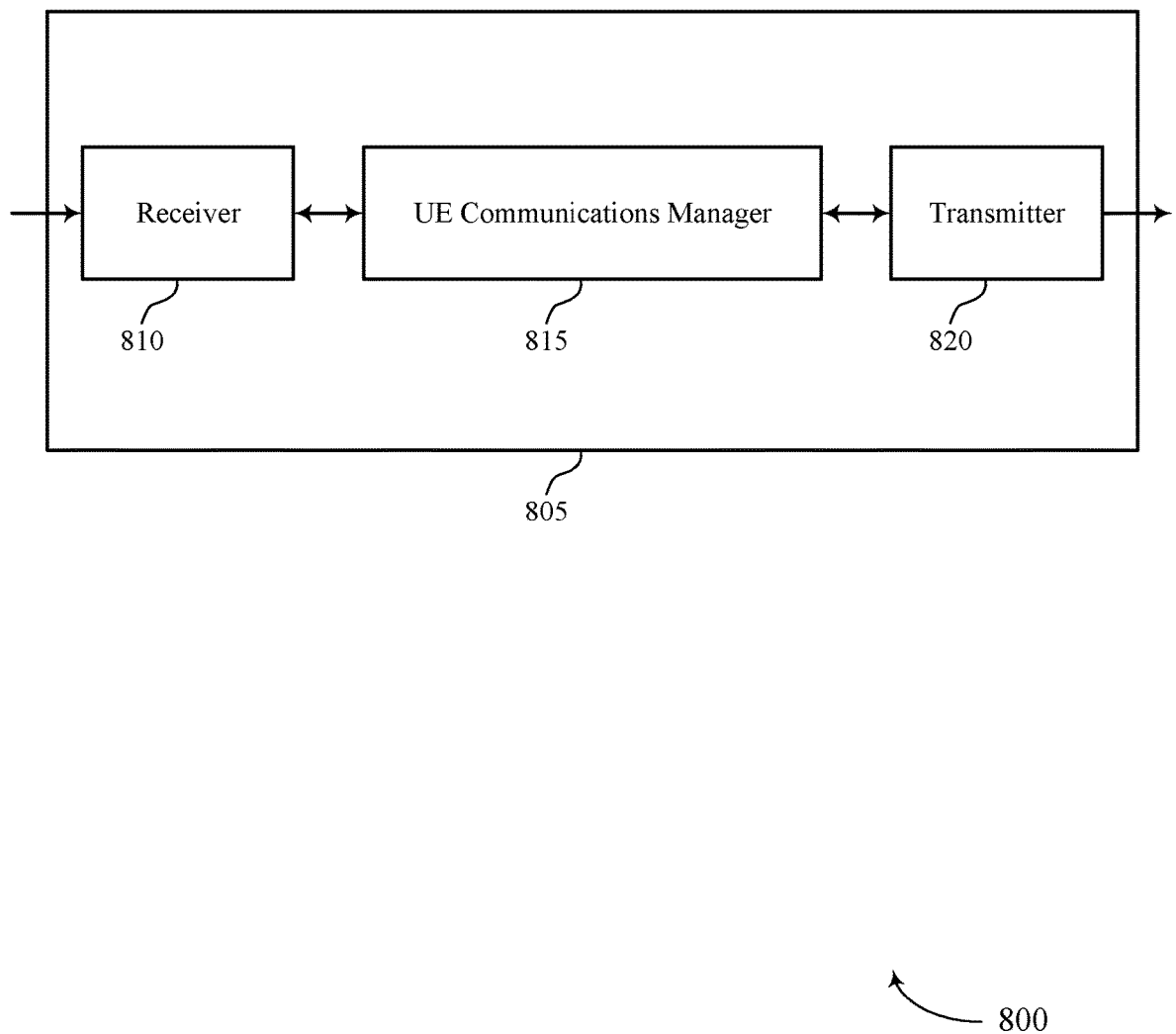
FIGS. 8 and 9 show block diagrams of devices that support out-of-order operation in accordance with aspects of the present disclosure.

FIG. 8 shows a block diagram 800 of a device 805 that supports supporting out-of-order operation in accordance with aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to supporting out-of-order operation, etc.). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may transmit, to a base station, an indication of a UE capability to support a set of priority classes for communications on a set of frequency resources of a radio frequency spectrum band. Subsequently, the UE communications manager 815 may receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes. Accordingly, the UE communications manager 815 may communicate, based on the indicated UE capability, a first response signal associated with the first downlink signal and a second response signal associated with the second downlink signal, where the first response signal is communicated following the second response signal. The UE communications manager 815 may be an example of aspects of the UE communications manager 1110 described herein.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
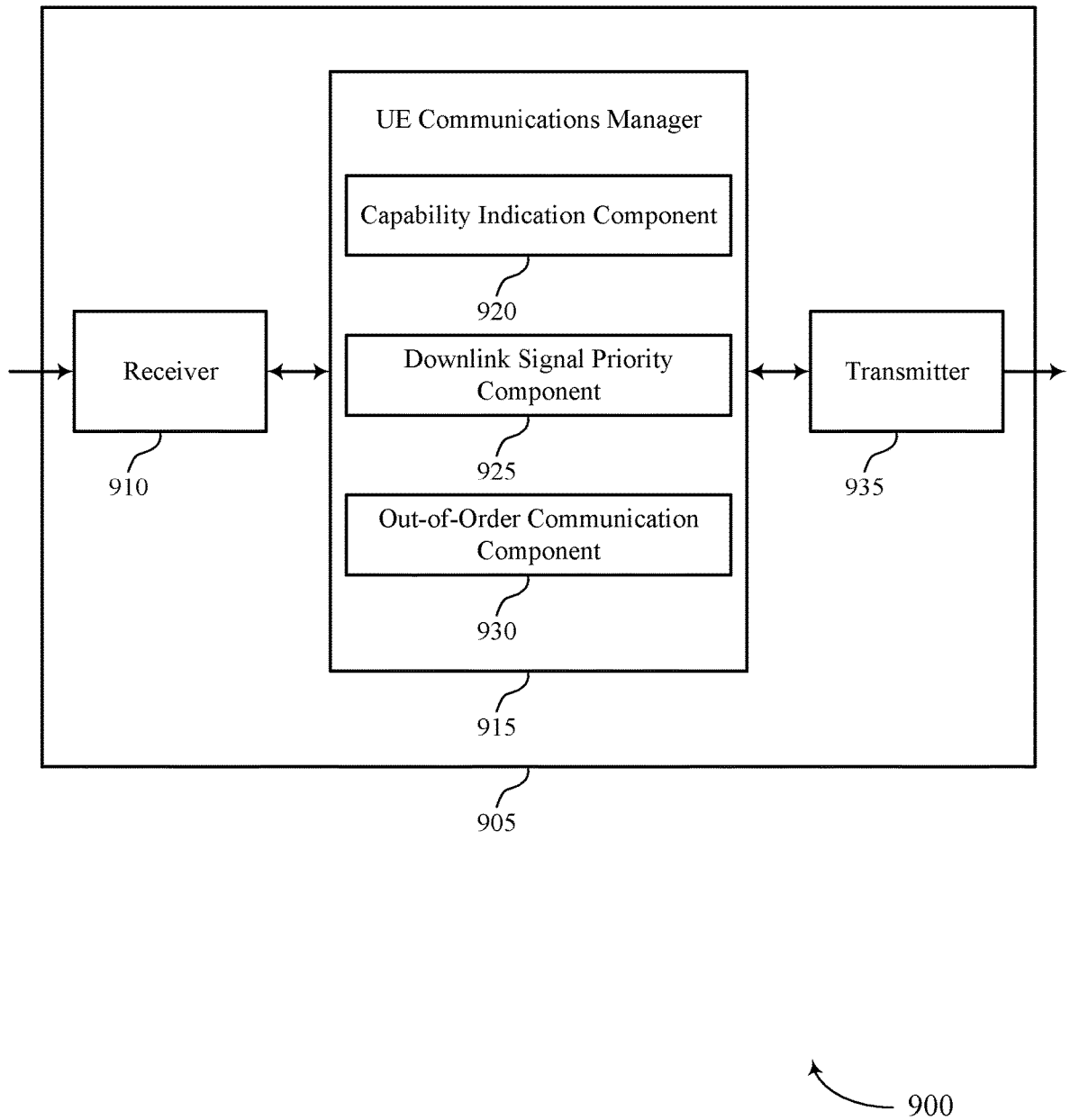

FIG. 9 shows a block diagram 900 of a device 905 that supports supporting out-of-order operation in accordance with aspects of the present disclosure. The device 905 may be an example of aspects of a device 805, or a UE 115 as described herein. The device 905 may include a receiver 910, a UE communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to supporting out-of-order operation, etc.). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a capability indication component 920, a downlink signal priority component 925, and an out-of-order communication component 930. The UE communications manager 915 may be an example of aspects of the UE communications manager 1110 described herein.

The capability indication component 920 may transmit, to a base station, an indication of a UE capability to support a set of priority classes for communications on a set of frequency resources of a radio frequency spectrum band.

The downlink signal priority component 925 may receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes.

The out-of-order communication component 930 may communicate, based on the indicated UE capability, a first response signal associated with the first downlink signal and a second response signal associated with the second downlink signal, where the first response signal is communicated following the second response signal.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
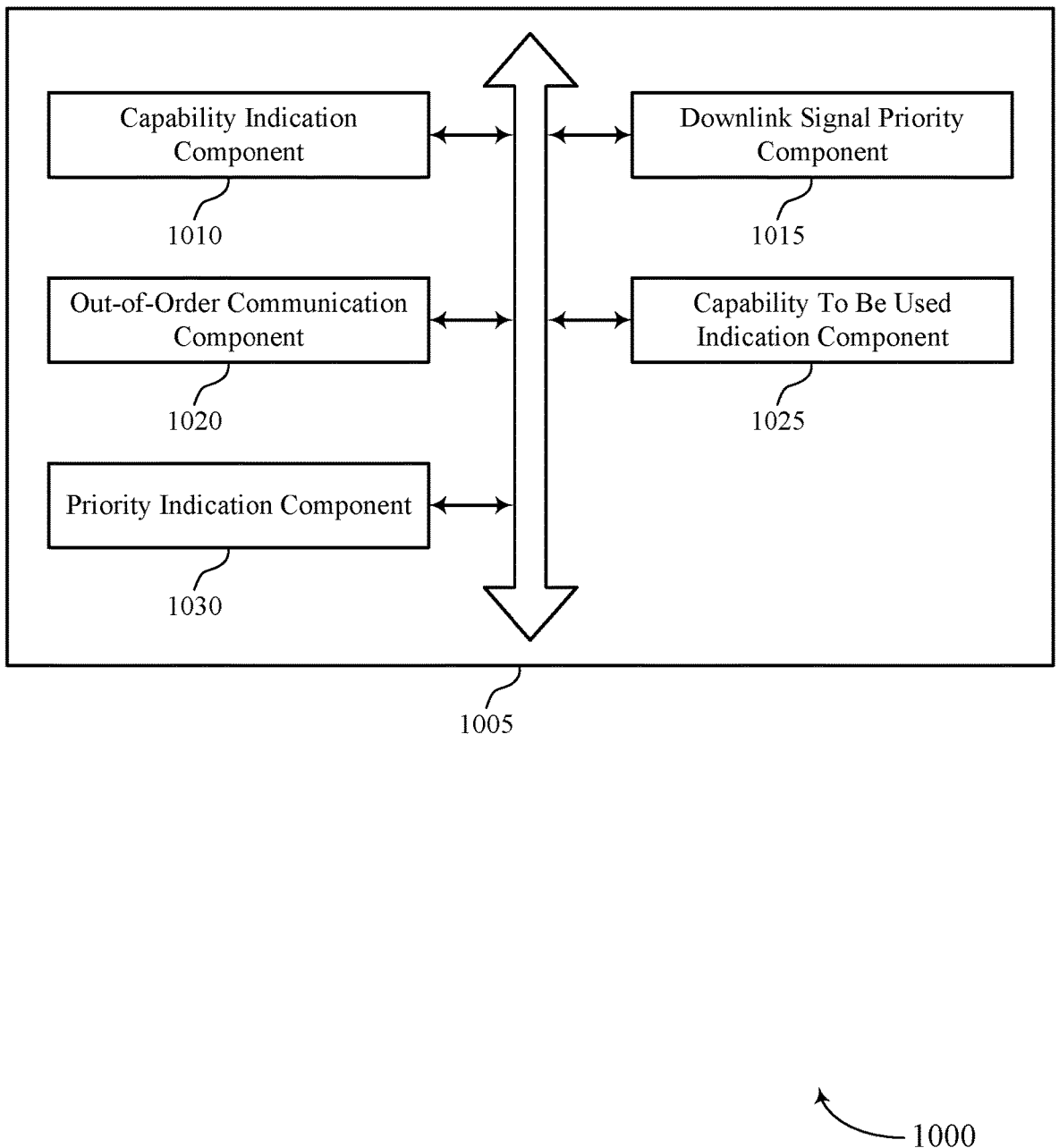
FIG. 10 shows a block diagram of a UE communications manager that supports out-of-order operation in accordance with aspects of the present disclosure.

FIG. 10 shows a block diagram 1000 of a UE communications manager 1005 that supports supporting out-of-order operation in accordance with aspects of the present disclosure. The UE communications manager 1005 may be an example of aspects of a UE communications manager 815, a UE communications manager 915, or a UE communications manager 1110 described herein. The UE communications manager 1005 may include a capability indication component 1010, a downlink signal priority component 1015, an out-of-order communication component 1020, a capability to be used indication component 1025, and a priority indication component 1030. Each of these modules may communicate, directly or indirectly, with one another (e.g., via one or more buses).

The capability indication component 1010 may transmit, to a base station, an indication of a UE capability to support a set of priority classes for communications on a set of frequency resources of a radio frequency spectrum band. In some cases, the set of frequency resources of the radio frequency spectrum band may include a set of CCs, or a set of bands, or a set of band combinations, or a combination thereof. Accordingly, the capability indication component 1010 may identify the UE capability per CC, or per band, or per band combination, or a combination thereof. In some examples, the capability indication component 1010 may transmit RRC signaling that includes the indication of the UE capability.

In some examples, the capability indication component 1010 may identify a set of processing units of the UE to support the set of priority classes, each of the set of processing units associated with a respective one of the set of priority classes, where the indication of the UE capability includes an indication of the identified set of processing units of the UE. In some examples, the capability indication component 1010 may transmit a total number of available processing units, a number of processing units available for each priority class of the set of priority classes, or a combination thereof.

Additionally or alternatively, the capability indication component 1010 may identify a set of combinations of the set of priority classes, each combination of the set of combinations including one or more priority classes of the set of priority classes and may determine, for each combination of the set of combinations, a scaling factor for communications by the UE based on a maximum data rate for communications by the UE, where the indication of the UE capability includes an indication of the determined scaling factors.

In some examples, the capability indication component 1010 may determine, for each priority class of the set of priority classes, a carrier aggregation capability of the UE associated with the priority class, where the indication of the UE capability includes an indication of the determination. In some cases, the indication of the UE capability may further include a MIMO capability, or a maximum modulation order, or a maximum number of resource blocks, or a combination thereof.

In some examples, the capability indication component 1010 may determine a maximum data rate for the first priority class and determine a maximum data rate for the second priority class. In some examples, transmitting an indication of a UE capability may include transmitting an indication of the maximum data rate for the first priority class and an indication of the maximum data rate for the second priority class.

The downlink signal priority component 1015 may receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes.

In some examples, the first priority class may be associated with a first processing timeline, and the second priority class may be associated with a second processing timeline that is shorter than the first processing timeline.

In some examples, receiving the first downlink signal and the second downlink signal may be based at least in part on transmitting the indication of the maximum data rate for the first priority class and the indication of the maximum data rate for the second priority class.

The out-of-order communication component 1020 may communicate, based on the indicated UE capability, a first response signal associated with the first downlink signal and a second response signal associated with the second downlink signal, where the first response signal is communicated following the second response signal. In some examples, transmissions associated with the first priority class may be in order relative to other transmissions of the first priority class, and transmissions associated with the second priority class may be in order relative to other transmissions of the second priority class.

In some examples, the out-of-order communication component 1020 may receive a first DCI and a second DCI and may communicate the first response signal and the second response signal based on transmitting a first uplink data signal based on the received first DCI and a second uplink data signal based on the received second DCI. Additionally or alternatively, the out-of-order communication component 1020 may communicate the first response signal and the second response signal based on receiving a first downlink data signal for the received first downlink control information and a second downlink data signal for the received second downlink control information.

In some examples, the out-of-order communication component 1020 may receive a first downlink data signal and a second downlink data signal, and may communicate the first response signal and the second response signal based on transmitting a first uplink control signal in response to the received first downlink data signal and a second uplink control signal in response to the received second downlink data signal.

The capability to be used indication component 1025 may receive, from the base station in response to the transmitted indication of the UE capability, an indication that the UE capability is to be used, where the first downlink signal, or the second downlink signal, or the first response signal, or the second response signal, or a combination thereof, are received based on the received indication that the UE capability is to be used.

The priority indication component 1030 may receive, for each of the first downlink signal and the second downlink signal, an indication of a priority class of the set of priority classes associated with the downlink signal. In some cases, the received indication of the priority class may include a DCI format, or a DCI bit, or a TCI state, or an RNTI, or a CORESET index, or a search space index, or a combination thereof, of the downlink signal.

Figure 11:
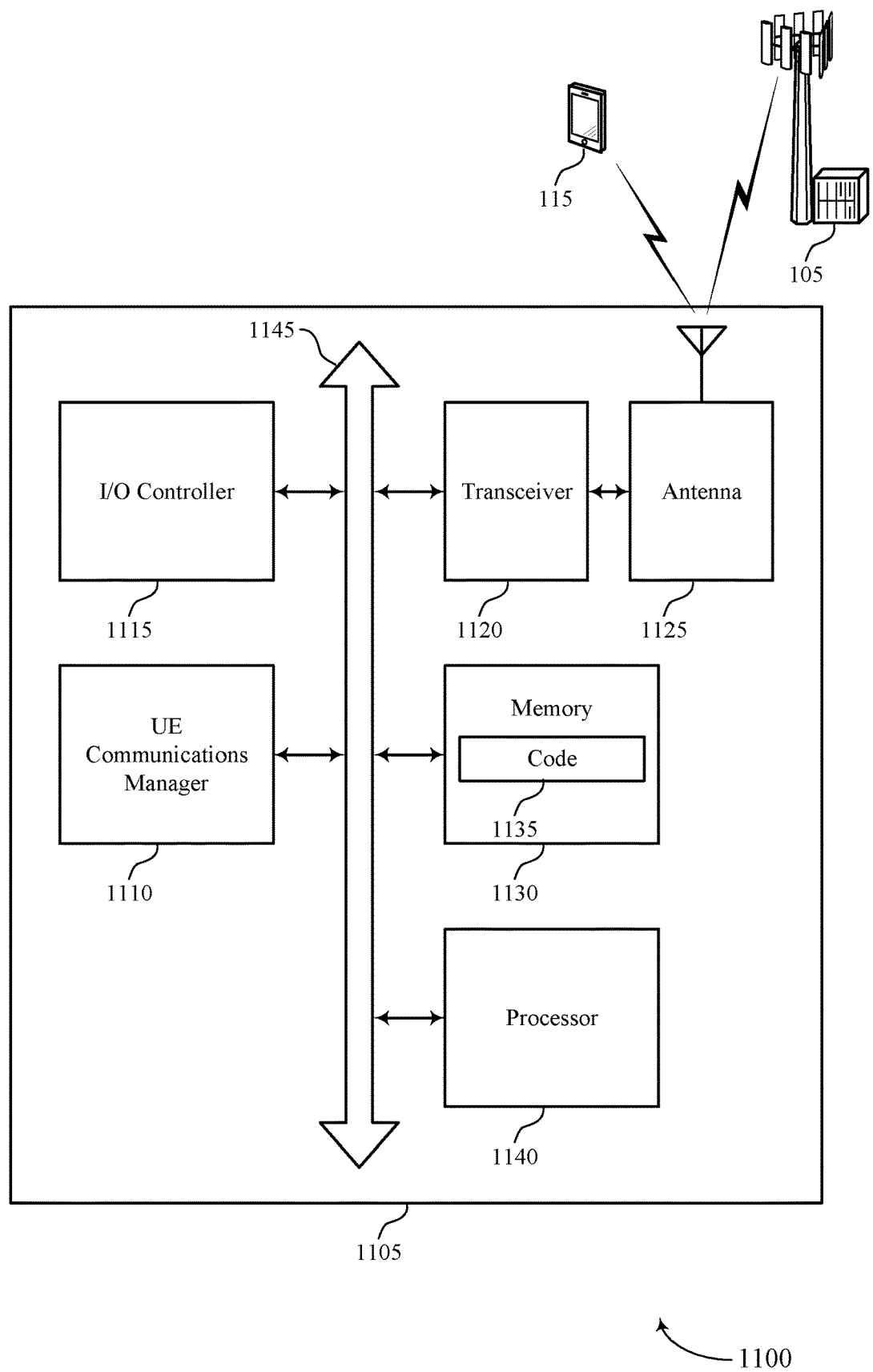
FIG. 11 shows a diagram of a system including a device that supports out-of-order operation in accordance with aspects of the present disclosure.

FIG. 11 shows a diagram of a system 1100 including a device 1105 that supports supporting out-of-order operation in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may transmit, to a base station, an indication of a UE capability to support a set of priority classes for communications on a set of frequency resources of a radio frequency spectrum band. Subsequently, the UE communications manager 1110 may receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes. Accordingly, the UE communications manager 1110 may communicate, based on the indicated UE capability, a first response signal associated with the first downlink signal and a second response signal associated with the second downlink signal, where the first response signal is communicated following the second response signal.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting out-of-order operation).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
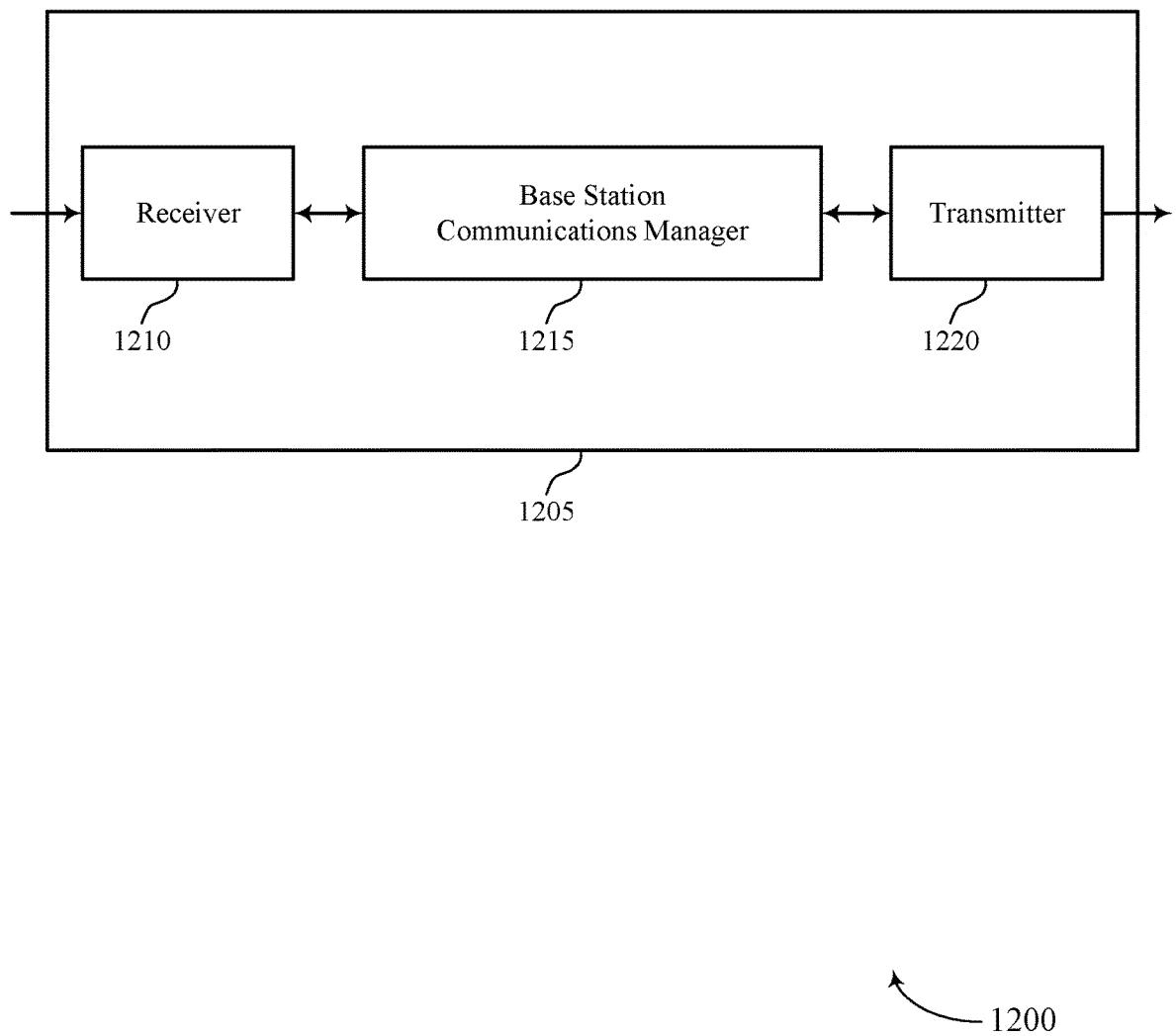
FIGS. 12 and 13 show block diagrams of devices that support out-of-order operation in accordance with aspects of the present disclosure.

FIG. 12 shows a block diagram 1200 of a device 1205 that supports supporting out-of-order operation in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to supporting out-of-order operation, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may receive, from a UE, an indication of a UE capability to support a set of priority classes for communications on a set of frequency resources of a radio frequency spectrum band. In some cases, the base station communications manager 1215 may configure the UE to operate to communicate traffic according to a set of priority classes of the set of priority classes based on the received indication. Additionally, the base station communications manager 1215 may transmit, to the UE, a first downlink signal and a second downlink signal, the second downlink signal following the first downlink signal in time on the set of frequency resources, the first downlink signal of a first priority class of the set of priority classes, and the second downlink signal of a second priority class of the set of priority classes. Accordingly, the base station communications manager 1215 may communicate, based on the indicated UE capability, a first response signal associated with the first downlink signal and a second response signal associated with the second downlink signal, where the first response signal is communicated following the second response signal. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
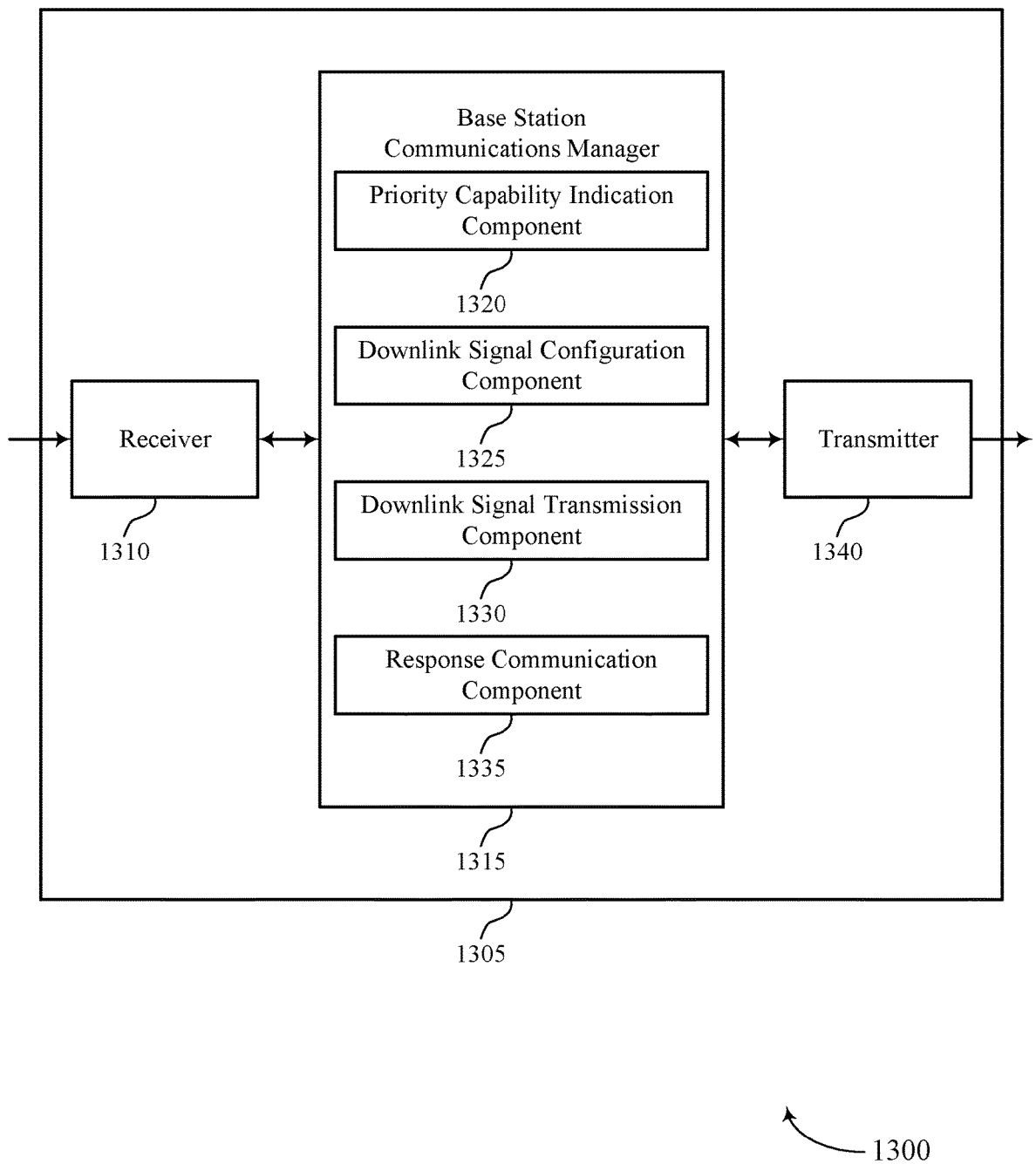

FIG. 13 shows a block diagram 1300 of a device 1305 that supports supporting out-of-order operation in accordance with aspects of the present disclosure. The device 1305 may be an example of aspects of a device 1205, or a base station 105 as described herein. The device 1305 may include a receiver 1310, a base station communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to supporting out-of-order operation, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a priority capability indication component 1320, a downlink signal configuration component 1325, a downlink signal transmission component 1330, and a response communication component 1335. The base station communications manager 1315 may be an example of aspects of the base station communications manager 1510 described herein.

The priority capability indication component 1320 may receive, from a UE, an indication of a UE capability to support a set of priority classes for communications on a set of frequency resources of a radio frequency spectrum band.

The downlink signal configuration component 1325 may configure the UE to operate to communicate traffic according to a set of priority classes of the set of priority classes based on the received indication.

The downlink signal transmission component 1330 may transmit, to the UE, a first downlink signal and a second downlink signal, the second downlink signal following the first downlink signal in time on the set of frequency resources, the first downlink signal of a first priority class of the set of priority classes, and the second downlink signal of a second priority class of the set of priority classes.

The response communication component 1335 may communicate, based on the indicated UE capability, a first response signal associated with the first downlink signal and a second response signal associated with the second downlink signal, where the first response signal is communicated following the second response signal.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
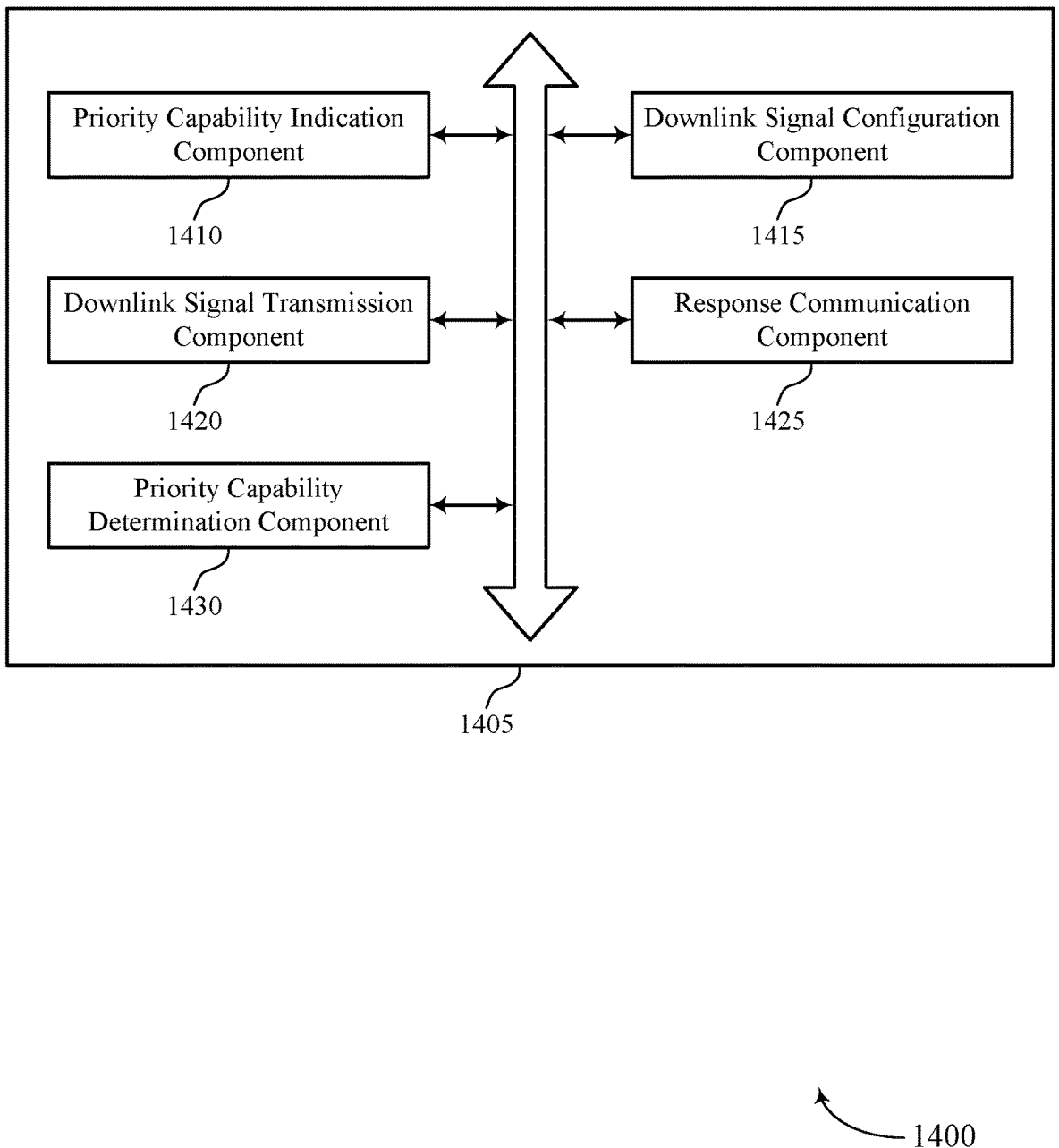
FIG. 14 shows a block diagram of a base station communications manager that supports out-of-order operation in accordance with aspects of the present disclosure.

FIG. 14 shows a block diagram 1400 of a base station communications manager 1405 that supports supporting out-of-order operation in accordance with aspects of the present disclosure. The base station communications manager 1405 may be an example of aspects of a base station communications manager 1215, a base station communications manager 1315, or a base station communications manager 1510 described herein. The base station communications manager 1405 may include a priority capability indication component 1410, a downlink signal configuration component 1415, a downlink signal transmission component 1420, a response communication component 1425, and a priority capability determination component 1430. Each of these modules may communicate, directly or indirectly, with one another (e.g., via one or more buses).

The priority capability indication component 1410 may receive, from a UE, an indication of a UE capability to support a set of priority classes for communications on a set of frequency resources of a radio frequency spectrum band.

The downlink signal configuration component 1415 may configure the UE to operate to communicate traffic according to a set of priority classes of the set of priority classes based on the received indication.

The downlink signal transmission component 1420 may transmit, to the UE, a first downlink signal and a second downlink signal, the second downlink signal following the first downlink signal in time on the set of frequency resources, the first downlink signal of a first priority class of the set of priority classes, and the second downlink signal of a second priority class of the set of priority classes.

The response communication component 1425 may communicate, based on the indicated UE capability, a first response signal associated with the first downlink signal and a second response signal associated with the second downlink signal, where the first response signal is communicated following the second response signal.

The priority capability determination component 1430 may determine, based on the received indication of the UE capability, a set of processing units of the UE to support the set of priority classes, each of the set of processing units associated with a respective one of the set of priority classes. In some examples, the priority capability determination component 1430 may determine, based on the received indication of the UE capability, a scaling factor for communications by the UE for each combination of a set of combinations of the set of priority classes. Additionally or alternatively, the priority capability determination component 1430 may determine, for each priority class of the set of priority classes and based on the received indication of the UE capability, a carrier aggregation capability of the UE associated with the priority class.

Figure 15:
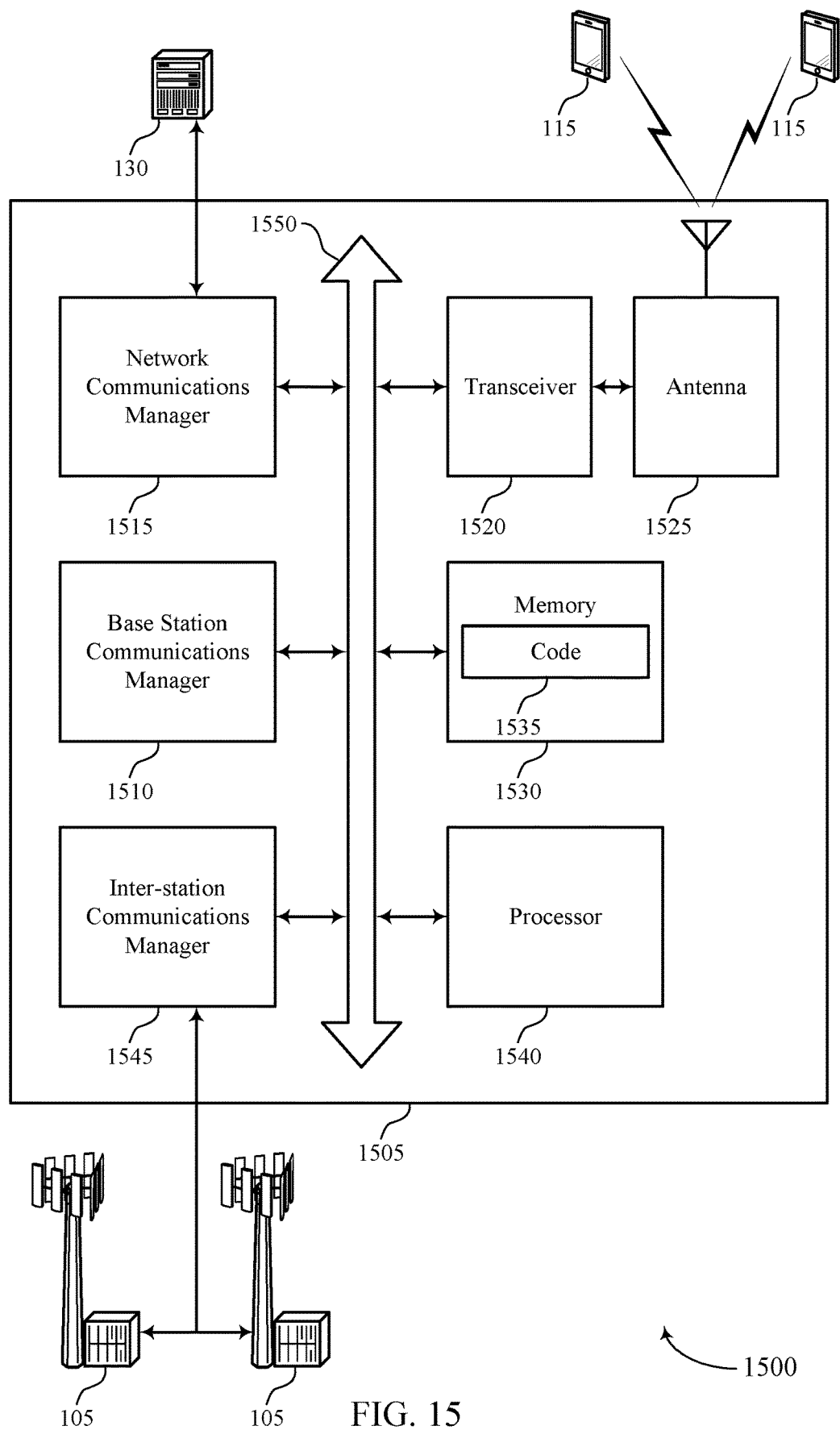
FIG. 15 shows a diagram of a system including a device that supports out-of-order operation in accordance with aspects of the present disclosure.

FIG. 15 shows a diagram of a system 1500 including a device 1505 that supports supporting out-of-order operation in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may receive, from a UE, an indication of a UE capability to support a set of priority classes for communications on a set of frequency resources of a radio frequency spectrum band. In some cases, the base station communications manager 1510 may configure the UE to operate to communicate traffic according to a set of priority classes of the set of priority classes based on the received indication. Additionally, the base station communications manager 1510 may transmit, to the UE, a first downlink signal and a second downlink signal, the second downlink signal following the first downlink signal in time on the set of frequency resources, the first downlink signal of a first priority class of the set of priority classes, and the second downlink signal of a second priority class of the set of priority classes. Accordingly, the base station communications manager 1510 may communicate, based on the indicated UE capability, a first response signal associated with the first downlink signal and a second response signal associated with the second downlink signal, where the first response signal is communicated following the second response signal.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a central processing unit, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting out-of-order operation).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
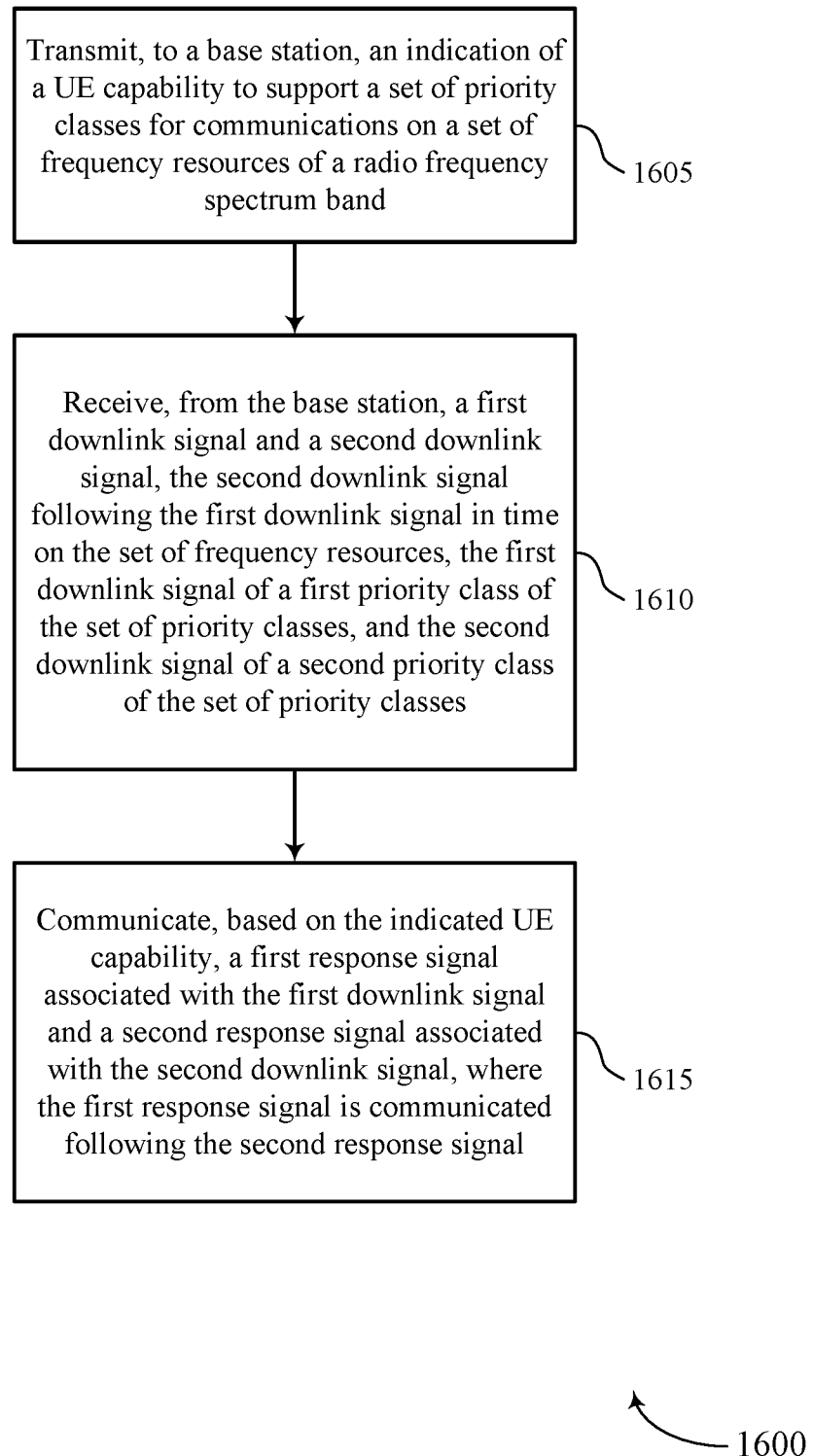
FIGS. 16 through 20 show flowcharts illustrating methods that support out-of-order operation in accordance with aspects of the present disclosure.

FIG. 16 shows a flowchart illustrating a method 1600 that supports supporting out-of-order operation in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may transmit, to a base station, an indication of a UE capability to support a set of priority classes for communications on a set of frequency resources of a radio frequency spectrum band. The operations of 1605 may be performed according to the methods described herein. In some examples, aspects of the operations of 1605 may be performed by a capability indication component as described with reference to FIGS. 8 through 11.

At 1610, the UE may receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes. The operations of 1610 may be performed according to the methods described herein. In some examples, aspects of the operations of 1610 may be performed by a downlink signal priority component as described with reference to FIGS. 8 through 11.

At 1615, the UE may communicate, based on the indicated UE capability, a first response signal associated with the first downlink signal and a second response signal associated with the second downlink signal, where the first response signal is communicated following the second response signal. The operations of 1615 may be performed according to the methods described herein. In some examples, aspects of the operations of 1615 may be performed by an out-of-order communication component as described with reference to FIGS. 8 through 11.

Figure 17:
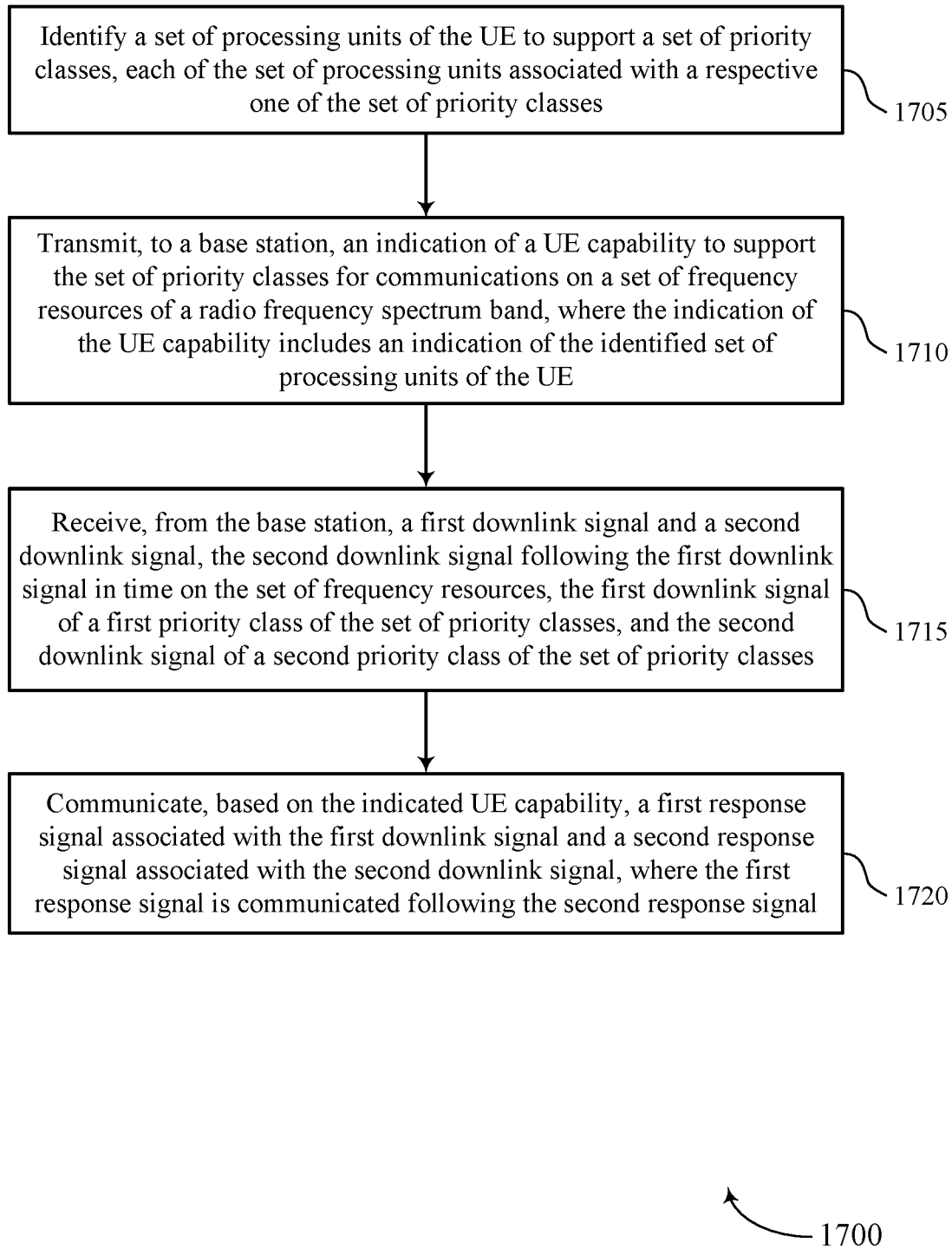

FIG. 17 shows a flowchart illustrating a method 1700 that supports supporting out-of-order operation in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may identify a set of processing units of the UE to support a set of priority classes, each of the set of processing units associated with a respective one of the set of priority classes. The operations of 1705 may be performed according to the methods described herein. In some examples, aspects of the operations of 1705 may be performed by a capability indication component as described with reference to FIGS. 8 through 11.

At 1710, the UE may transmit, to a base station, an indication of a UE capability to support the set of priority classes for communications on a set of frequency resources of a radio frequency spectrum band, where the indication of the UE capability includes an indication of the identified set of processing units of the UE. The operations of 1710 may be performed according to the methods described herein. In some examples, aspects of the operations of 1710 may be performed by a capability indication component as described with reference to FIGS. 8 through 11.

At 1715, the UE may receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes. The operations of 1715 may be performed according to the methods described herein. In some examples, aspects of the operations of 1715 may be performed by a downlink signal priority component as described with reference to FIGS. 8 through 11.

At 1720, the UE may communicate, based on the indicated UE capability, a first response signal associated with the first downlink signal and a second response signal associated with the second downlink signal, where the first response signal is communicated following the second response signal. The operations of 1720 may be performed according to the methods described herein. In some examples, aspects of the operations of 1720 may be performed by an out-of-order communication component as described with reference to FIGS. 8 through 11.

Figure 18:
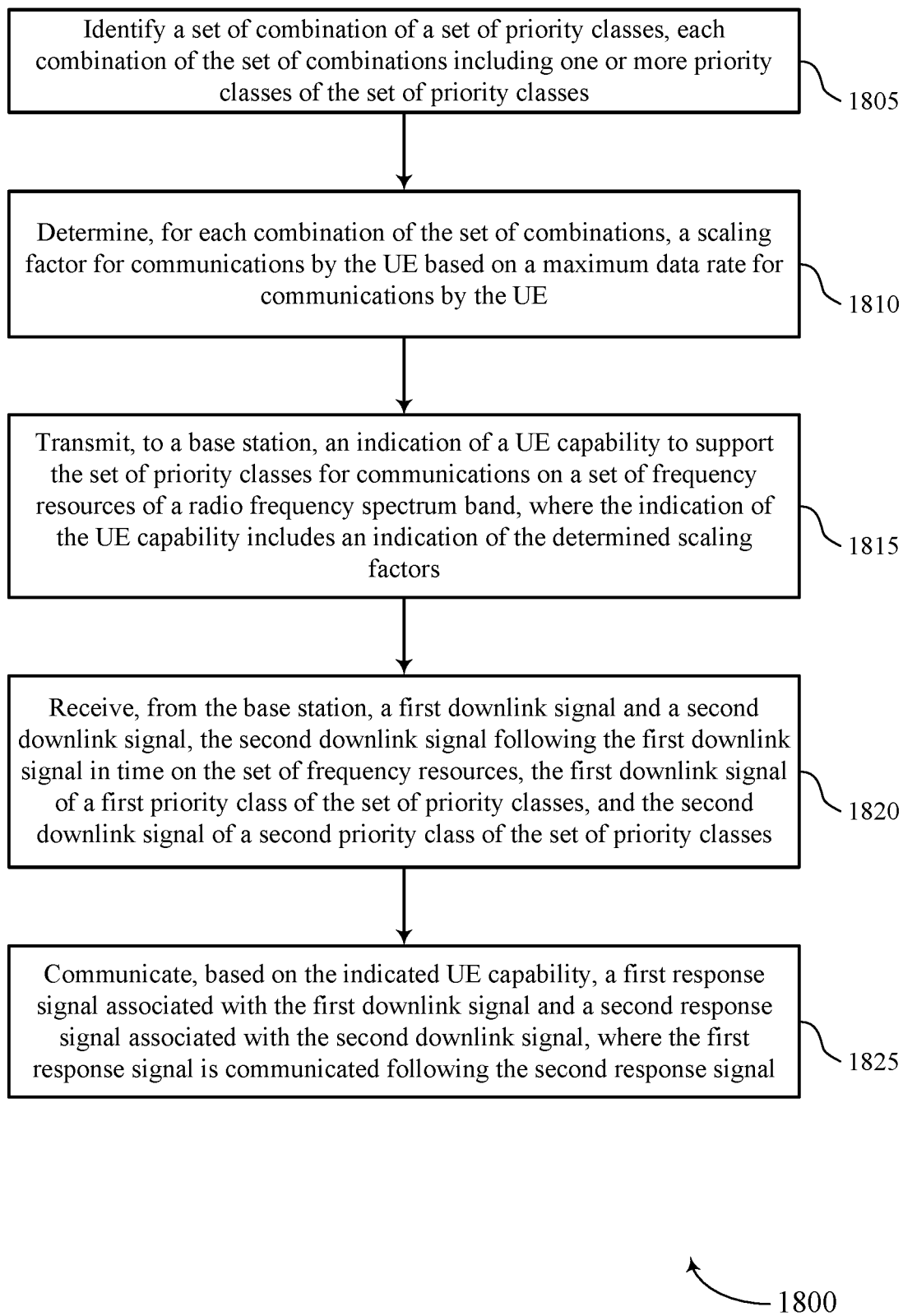

FIG. 18 shows a flowchart illustrating a method 1800 that supports supporting out-of-order operation in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may identify a set of combinations of a set of priority classes, each combination of the set of combinations including one or more priority classes of the set of priority classes. The operations of 1805 may be performed according to the methods described herein. In some examples, aspects of the operations of 1805 may be performed by a capability indication component as described with reference to FIGS. 8 through 11.

At 1810, the UE may determine, for each combination of the set of combinations, a scaling factor for communications by the UE based on a maximum data rate for communications by the UE. The operations of 1810 may be performed according to the methods described herein. In some examples, aspects of the operations of 1810 may be performed by a capability indication component as described with reference to FIGS. 8 through 11.

At 1815, the UE may transmit, to a base station, an indication of a UE capability to support the set of priority classes for communications on a set of frequency resources of a radio frequency spectrum band, where the indication of the UE capability includes an indication of the determined scaling factors. The operations of 1815 may be performed according to the methods described herein. In some examples, aspects of the operations of 1815 may be performed by a capability indication component as described with reference to FIGS. 8 through 11.

At 1820, the UE may receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes. The operations of 1820 may be performed according to the methods described herein. In some examples, aspects of the operations of 1820 may be performed by a downlink signal priority component as described with reference to FIGS. 8 through 11.

At 1825, the UE may communicate, based on the indicated UE capability, a first response signal associated with the first downlink signal and a second response signal associated with the second downlink signal, where the first response signal is communicated following the second response signal. The operations of 1825 may be performed according to the methods described herein. In some examples, aspects of the operations of 1825 may be performed by an out-of-order communication component as described with reference to FIGS. 8 through 11.

Figure 19:
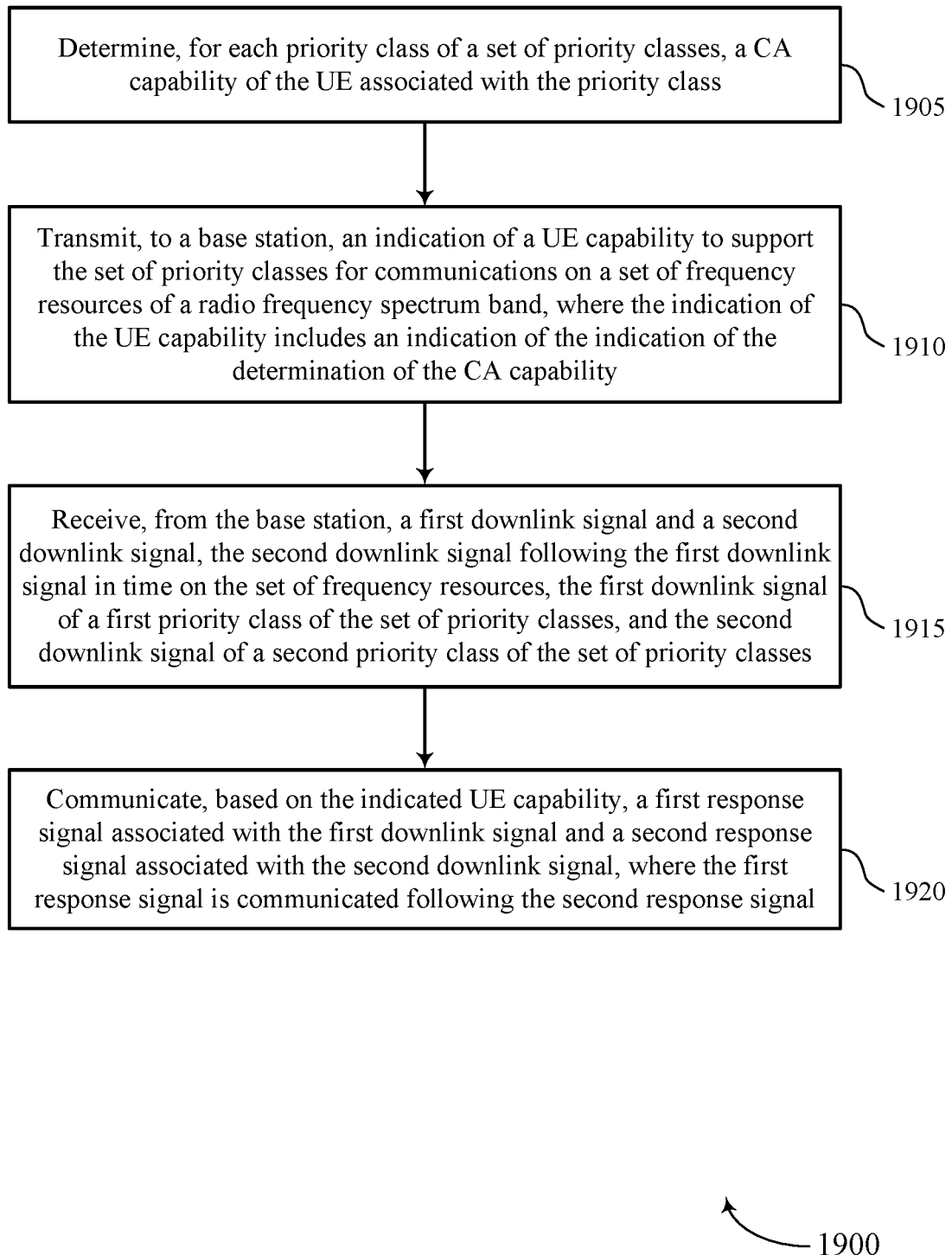

FIG. 19 shows a flowchart illustrating a method 1900 that supports supporting out-of-order operation in accordance with aspects of the present disclosure. The operations of method 1900 may be implemented by a UE 115 or its components as described herein. For example, the operations of method 1900 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may determine, for each priority class of a set of priority classes, a CA capability of the UE associated with the priority class. The operations of 1905 may be performed according to the methods described herein. In some examples, aspects of the operations of 1905 may be performed by a capability indication component as described with reference to FIGS. 8 through 11.

At 1910, the UE may transmit, to a base station, an indication of a UE capability to support a set of priority classes for communications on a set of frequency resources of a radio frequency spectrum band, where the indication of the UE capability includes an indication of the determination of the CA capability. The operations of 1910 may be performed according to the methods described herein. In some examples, aspects of the operations of 1910 may be performed by a capability indication component as described with reference to FIGS. 8 through 11.

At 1915, the UE may receive, from the base station, a first downlink signal and a second downlink signal, the second downlink signal following the first downlink signal in time on the set of frequency resources, the first downlink signal of a first priority class of the set of priority classes, and the second downlink signal of a second priority class of the set of priority classes. The operations of 1915 may be performed according to the methods described herein. In some examples, aspects of the operations of 1915 may be performed by a downlink signal priority component as described with reference to FIGS. 8 through 11.

At 1920, the UE may communicate, based on the indicated UE capability, a first response signal associated with the first downlink signal and a second response signal associated with the second downlink signal, where the first response signal is communicated following the second response signal. The operations of 1920 may be performed according to the methods described herein. In some examples, aspects of the operations of 1920 may be performed by an out-of-order communication component as described with reference to FIGS. 8 through 11.

Figure 20:
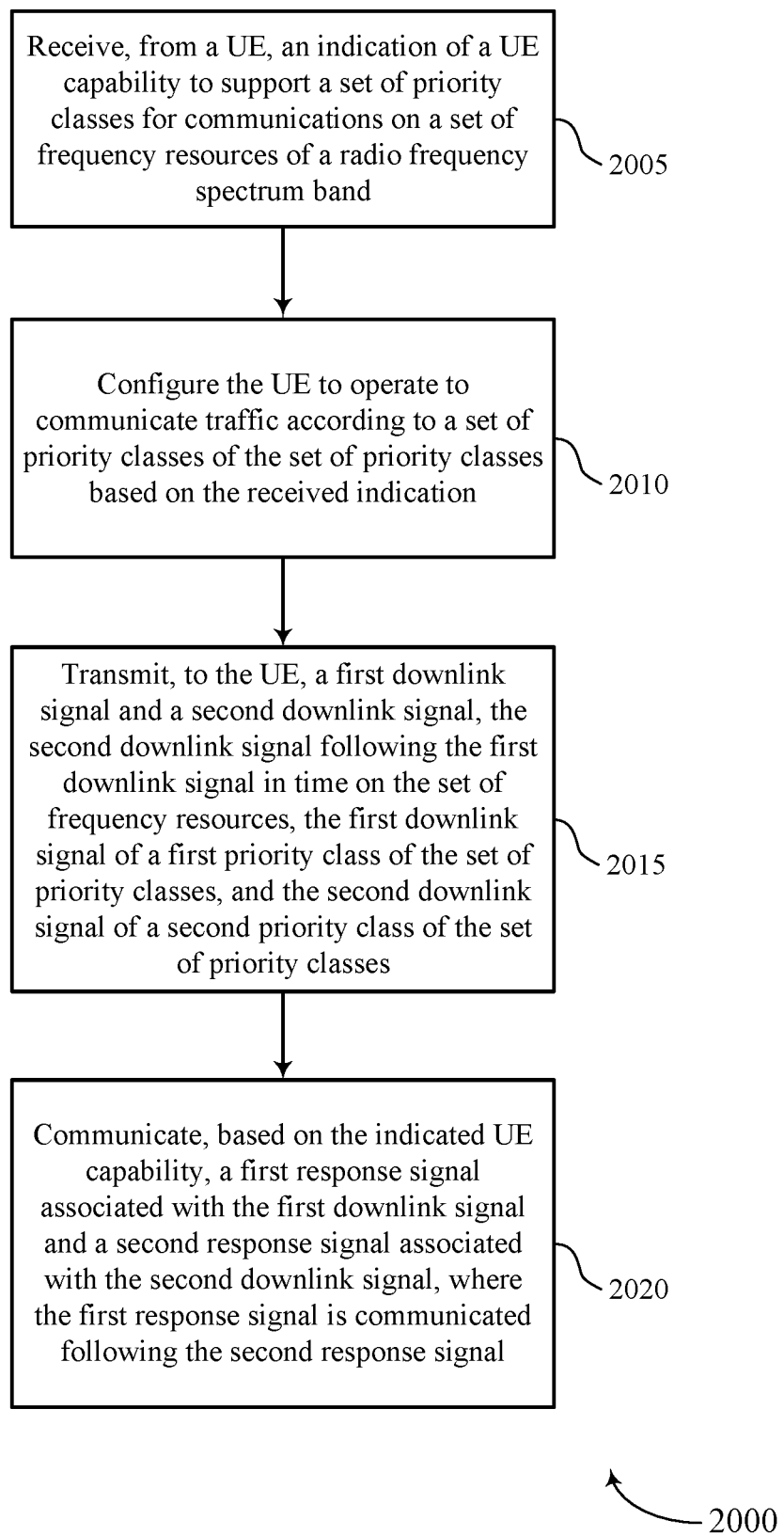

FIG. 20 shows a flowchart illustrating a method 2000 that supports supporting out-of-order operation in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may receive, from a UE, an indication of a UE capability to support a set of priority classes for communications on a set of frequency resources of a radio frequency spectrum band. The operations of 2005 may be performed according to the methods described herein. In some examples, aspects of the operations of 2005 may be performed by a priority capability indication component as described with reference to FIGS. 12 through 15.

At 2010, the base station may configure the UE to operate to communicate traffic according to a set of priority classes of the set of priority classes based on the received indication. The operations of 2010 may be performed according to the methods described herein. In some examples, aspects of the operations of 2010 may be performed by a downlink signal configuration component as described with reference to FIGS. 12 through 15.

At 2015, the base station may transmit, to the UE, a first downlink signal and a second downlink signal, the second downlink signal following the first downlink signal in time on the set of frequency resources, the first downlink signal of a first priority class of the set of priority classes, and the second downlink signal of a second priority class of the set of priority classes. The operations of 2015 may be performed according to the methods described herein. In some examples, aspects of the operations of 2015 may be performed by a downlink signal transmission component as described with reference to FIGS. 12 through 15.

At 2020, the base station may communicate, based on the indicated UE capability, a first response signal associated with the first downlink signal and a second response signal associated with the second downlink signal, where the first response signal is communicated following the second response signal. The operations of 2020 may be performed according to the methods described herein. In some examples, aspects of the operations of 2020 may be performed by a response communication component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting, to a base station, an indication of a UE capability to support a plurality of priority classes for communications on a set of frequency resources of a radio frequency spectrum band;
   receiving, from the base station, a first downlink signal and a second downlink signal, the second downlink signal following the first downlink signal in time on the set of frequency resources, the first downlink signal of a first priority class of the plurality of priority classes, and the second downlink signal of a second priority class of the plurality of priority classes; and
   communicating, based at least in part on the indicated UE capability, a first response signal associated with the first downlink signal and a second response signal associated with the second downlink signal, wherein the first response signal is communicated following the second response signal.

2. The method of claim 1, further comprising:
   determining a maximum data rate for the first priority class; and
   determining a maximum data rate for the second priority class.

3. The method of claim 2, wherein:
   transmitting the indication of the UE capability comprises transmitting an indication of the maximum data rate for the first priority class and an indication of the maximum data rate for the second priority class; and
   receiving the first downlink signal and the second downlink signal is based at least in part on transmitting the indication of the maximum data rate for the first priority class and the indication of the maximum data rate for the second priority class.

4. The method of claim 1, further comprising:
   identifying a plurality of processing units of the UE to support the plurality of priority classes, each of the plurality of processing units associated with a respective one of the plurality of priority classes, wherein the indication of the UE capability comprises an indication of the identified plurality of processing units of the UE.

5. The method of claim 1, further comprising:
   identifying a set of combinations of the plurality of priority classes, each combination of the set of combinations comprising one or more priority classes of the plurality of priority classes; and
   determining, for each combination of the set of combinations, a scaling factor for communications by the UE based at least in part on a maximum data rate for communications by the UE, wherein the indication of the UE capability comprises an indication of the determined scaling factors.

6. The method of claim 1, further comprising:
   determining, for each priority class of the plurality of priority classes, a carrier aggregation capability of the UE associated with the priority class, wherein the indication of the UE capability comprises an indication of the determination.

7. The method of claim 1, wherein the indication of the UE capability further comprises a multiple-input multiple-output capability, or a maximum modulation order, or a maximum number of resource blocks, or a combination thereof.

8. The method of claim 1, further comprising:
   receiving, from the base station in response to the transmitted indication of the UE capability, an indication that the UE capability is to be used, wherein the first downlink signal, or the second downlink signal, or the first response signal, or the second response signal, or a combination thereof, are received based at least in part on the received indication that the UE capability is to be used.

9. The method of claim 1, further comprising:
   receiving, for each of the first downlink signal and the second downlink signal, an indication of a priority class of the plurality of priority classes associated with the respective downlink signal.

10. The method of claim 1, wherein the first priority class is associated with a first processing timeline, and the second priority class is associated with a second processing timeline that is shorter than the first processing timeline.

11. The method of claim 1, wherein:
    transmissions associated with the first priority class are in order relative to other transmissions of the first priority class; and transmissions associated with the second priority class are in order relative to other transmissions of the second priority class.

12. The method of claim 1, further comprising:
identifying the UE capability per component carrier, or per band, or per band combination, or a combination thereof.

13. The method of claim 1, wherein transmitting the indication of the UE capability further comprises:
transmitting a total number of available processing units, a number of processing units available for each priority class of the plurality of priority classes, or a combination thereof.

14. The method of claim 1, wherein the set of frequency resources of the radio frequency spectrum band comprise a set of component carriers, or a set of bands, or a set of band combinations, or a combination thereof.

15. The method of claim 1, wherein:
receiving the first downlink signal and the second downlink signal comprises receiving a first downlink control information and a second downlink control information; and
communicating the first response signal and the second response signal comprises transmitting a first uplink data signal based at least in part on the received first downlink control information and a second uplink data signal based at least in part on the received second downlink control information.

16. The method of claim 1, wherein:
receiving the first downlink signal and the second downlink signal comprises receiving a first downlink control information and a second downlink control information; and
communicating the first response signal and the second response signal comprises receiving a first downlink data signal based at least in part on the received first downlink control information and a second downlink data signal based at least in part on the received second downlink control information.

17. The method of claim 1, wherein:
receiving the first downlink signal and the second downlink signal comprises receiving a first downlink data signal and a second downlink data signal; and
communicating the first response signal and the second response signal comprises transmitting a first uplink control signal in response to the received first downlink data signal and a second uplink control signal in response to the received second downlink data signal.

18. The method of claim 1, wherein transmitting the indication of the UE capability comprises:
transmitting radio resource control signaling that includes the indication of the UE capability.

19. A method for wireless communication at a base station, comprising:
receiving, from a user equipment (UE), an indication of a UE capability to support a plurality of priority classes for communications on a set of frequency resources of a radio frequency spectrum band;
configuring the UE to operate to communicate traffic according to a set of priority classes of the plurality of priority classes based at least in part on the received indication;
transmitting, to the UE, a first downlink signal and a second downlink signal, the second downlink signal following the first downlink signal in time on the set of frequency resources, the first downlink signal of a first priority class of the plurality of priority classes, and the second downlink signal of a second priority class of the plurality of priority classes; and
communicating, based at least in part on the indicated UE capability, a first response signal associated with the first downlink signal and a second response signal associated with the second downlink signal, wherein the first response signal is communicated following the second response signal.

20. The method of claim 19, further comprising:
determining, based at least in part on the received indication of the UE capability, a plurality of processing units of the UE to support the plurality of priority classes, each of the plurality of processing units associated with a respective one of the plurality of priority classes.

21. The method of claim 19, further comprising:
determining, based at least in part on the received indication of the UE capability, a scaling factor for communications by the UE for each combination of a set of combinations of the plurality of priority classes.

22. The method of claim 19, further comprising:
determining, for each priority class of the plurality of priority classes and based at least in part on the received indication of the UE capability, a carrier aggregation capability of the UE associated with the priority class.

23. The method of claim 1, wherein the first priority class is associated with a first processing timeline, and the second priority class is associated with a second processing timeline that is shorter than the first processing timeline.

24. An apparatus for wireless communication at a user equipment (UE), comprising:
a processor,
memory in electronic communication with the processor; and
instructions stored in the memory and executable by the processor to cause the apparatus to:
transmit, to a base station, an indication of a UE capability to support a plurality of priority classes for communications on a set of frequency resources of a radio frequency spectrum band;
receive, from the base station, a first downlink signal and a second downlink signal, the second downlink signal following the first downlink signal in time on the set of frequency resources, the first downlink signal of a first priority class of the plurality of priority classes, and the second downlink signal of a second priority class of the plurality of priority classes; and
communicate, based at least in part on the indicated UE capability, a first response signal associated with the first downlink signal and a second response signal associated with the second downlink signal, wherein the first response signal is communicated following the second response signal.

25. The apparatus of claim 24, wherein the instructions are further executable by the processor to cause the apparatus to:
determine a maximum data rate for the first priority class; and
determine a maximum data rate for the second priority class.

26. The apparatus of claim 25, wherein:
the instructions to transmit the indication of the UE capability are executable by the processor to cause the apparatus to transmit an indication of the maximum data rate for the first priority class and an indication of the maximum data rate for the second priority class; and the instructions to receive the first downlink signal and the second downlink signal are executable based at least in part on transmitting the indication of the maximum data rate for the first priority class and the indication of the maximum data rate for the second priority class.

27. The apparatus of claim 24, wherein the instructions are further executable by the processor to cause the apparatus to:

identify a plurality of processing units of the UE to support the plurality of priority classes, each of the plurality of processing units associated with a respective one of the plurality of priority classes, wherein the indication of the UE capability comprises an indication of the identified plurality of processing units of the UE.

28. The apparatus of claim 24, wherein the instructions are further executable by the processor to cause the apparatus to:

receive, from the base station in response to the transmitted indication of the UE capability, an indication that the UE capability is to be used, wherein the first downlink signal, or the second downlink signal, or the first response signal, or the second response signal, or a combination thereof, are received based at least in part on the received indication that the UE capability is to be used.

29. The apparatus of claim 24, wherein the first priority class is associated with a first processing timeline, and the second priority class is associated with a second processing timeline that is shorter than the first processing timeline.

30. An apparatus for wireless communication at a base station, comprising:

a processor, memory in electronic communication with the processor; and instructions stored in the memory and executable by the processor to cause the apparatus to:

receive, from a user equipment (UE), an indication of a UE capability to support a plurality of priority classes for communications on a set of frequency resources of a radio frequency spectrum band;

configure the UE to operate to communicate traffic according to a set of priority classes of the plurality of priority classes based at least in part on the received indication;

transmit, to the UE, a first downlink signal and a second downlink signal, the second downlink signal following the first downlink signal in time on the set of frequency resources, the first downlink signal of a first priority class of the plurality of priority classes, and the second downlink signal of a second priority class of the plurality of priority classes; and communicate, based at least in part on the indicated UE capability, a first response signal associated with the first downlink signal and a second response signal associated with the second downlink signal, wherein the first response signal is communicated following the second response signal.

* * * * *